US008944294B2

(12) United States Patent
Ophardt et al.

(10) Patent No.: US 8,944,294 B2
(45) Date of Patent: Feb. 3, 2015

(54) STATIONARY STEM PUMP

(75) Inventors: Heiner Ophardt, Vineland (CA); Ali Mirbach, Issum (DE)

(73) Assignee: Gotohti.com Inc., Beamsville (CA)

( * ) Notice: Subject to any disclaimer, the term of this patent is extended or adjusted under 35 U.S.C. 154(b) by 488 days.

(21) Appl. No.: 13/064,391

(22) Filed: Mar. 22, 2011

(65) Prior Publication Data

US 2011/0240680 A1 Oct. 6, 2011

(30) Foreign Application Priority Data

Apr. 1, 2010 (CA) ...................................... 2698915

(51) Int. Cl.

| | |
|---|---|
| ***B65D 88/54*** | (2006.01) |
| ***G01F 11/00*** | (2006.01) |
| ***A47K 5/12*** | (2006.01) |
| ***B05B 11/00*** | (2006.01) |

(52) U.S. Cl.

CPC ........... *A47K 5/1207* (2013.01); *B05B 11/3001* (2013.01); *B05B 11/3097* (2013.01)
USPC ..................... 222/321.8; 222/320; 222/321.6; 222/321.7

(58) Field of Classification Search

USPC ..................... 222/321.1, 321.3, 321.6–321.9, 222/319–320, 181.1, 383.1, 383.3, 385, 222/380; 417/545, 550; 92/107, 108, 181 P
See application file for complete search history.

(56) References Cited

U.S. PATENT DOCUMENTS

| | | | | |
|---|---|---|---|---|
| 3,228,347 | A * | 1/1966 | Corsette | 417/514 |
| 3,362,344 | A * | 1/1968 | Duda | 417/514 |
| 3,877,616 | A * | 4/1975 | Stevens | 222/321.9 |
| 4,017,031 | A * | 4/1977 | Kishi et al. | 239/333 |
| 4,154,374 | A * | 5/1979 | Kirk, Jr. | 222/321.2 |
| 4,530,449 | A * | 7/1985 | Nozawa et al. | 222/189.11 |
| 5,016,780 | A * | 5/1991 | Moretti | 222/153.13 |
| 5,165,577 | A | 11/1992 | Ophardt | |
| 5,282,552 | A | 2/1994 | Ophardt | |
| 5,373,970 | A | 12/1994 | Ophardt | |
| 5,431,309 | A | 7/1995 | Ophardt | |
| 5,489,044 | A | 2/1996 | Ophardt | |
| 5,676,277 | A | 10/1997 | Ophardt | |
| 5,806,721 | A * | 9/1998 | Tada | 222/153.13 |
| 5,975,360 | A | 11/1999 | Ophardt | |
| 6,343,724 | B1 | 2/2002 | Ophardt et al. | |
| 6,409,050 | B1 | 6/2002 | Ophardt et al. | |
| 6,446,840 | B2 | 9/2002 | Ophardt et al. | |
| 6,557,736 | B1 | 5/2003 | Ophardt | |
| 6,601,736 | B2 | 8/2003 | Ophardt et al. | |
| 7,267,251 | B2 | 9/2007 | Ophardt | |
| 7,303,099 | B2 | 12/2007 | Ophardt | |
| 7,337,930 | B2 | 3/2008 | Ophardt et al. | |
| RE40,319 | E | 5/2008 | Ophardt et al. | |
| 7,377,405 | B2 | 5/2008 | Ophardt | |
| 7,523,844 | B2 * | 4/2009 | Garcia | 222/321.7 |
| 7,556,178 | B2 | 7/2009 | Ophardt | |
| 7,661,561 | B2 | 2/2010 | Ophardt et al. | |
| 7,708,166 | B2 | 5/2010 | Ophardt | |
| 7,770,874 | B2 | 8/2010 | Ophardt et al. | |

(Continued)

*Primary Examiner* — Kevin P Shaver
*Assistant Examiner* — Matthew Lembo
(74) *Attorney, Agent, or Firm* — Thorpe North & Western LLP

(57) ABSTRACT

A pump assembly for dispensing flowable materials including a piston chamber-forming member providing an annular chamber about a center post and an annular piston-forming member reciprocally slidable in the annular chamber to dispense flowable material outwardly annularly about the center post.

18 Claims, 28 Drawing Sheets

(56) References Cited

U.S. PATENT DOCUMENTS

| | | | |
|---|---|---|---|
| 7,815,076 | B2 | 10/2010 | Ophardt |
| 7,823,751 | B2 | 11/2010 | Ophardt et al. |
| 7,959,037 | B2 | 6/2011 | Ophardt et al. |
| 8,056,772 | B2 | 11/2011 | Ophardt et al. |
| 8,157,134 | B2 | 4/2012 | Ophardt et al. |
| 2007/0257064 | A1 | 11/2007 | Ophardt |
| 2007/0284394 | A1 | 12/2007 | Ophardt |
| 2008/0017670 | A1 * | 1/2008 | Tada .......................... 222/321.8 |
| 2009/0145296 | A1 | 6/2009 | Ophardt et al. |
| 2009/0308894 | A1 | 12/2009 | Ophardt |
| 2010/0232997 | A1 | 9/2010 | Ophardt et al. |
| 2010/0260632 | A1 | 10/2010 | Ophardt et al. |
| 2011/0014076 | A1 | 1/2011 | Shi et al. |
| 2012/0104051 | A1 | 5/2012 | Ophardt et al. |

* cited by examiner

STATIONARY STEM PUMP

SCOPE OF THE INVENTION

This invention relates generally to a pump and, particularly, to a pump useful for dispensing pastes and high viscosity flowable materials and, more preferably, an inexpensive, preferably all plastic, disposable pump assembly for dispensing flowable materials.

BACKGROUND OF THE INVENTION

Many pump assemblies are known for dispensing flowable materials, however, most pumps generally have the disadvantage that they have difficulty in dispensing high viscosity flowable creams and lotions such as toothpaste, viscous skin creams and hand cleaners whether or not they include particulate solid matter.

Some high viscosity flowable pastes include particulate solid matter. The particulate solid matter may include grit and pumice. Grit is granular material, preferably sharp and relatively fine-sized as being used as an abrasive. Pumice is a volcanic glass which is full of cavities and very lightweight and may be provided as different sized particles to be used as an abrasive and absorbent in cleaners.

SUMMARY OF THE INVENTION

To at least partially overcome these disadvantages of previously known devices the present invention provides a pump assembly for dispensing flowable materials including a piston chamber-forming member providing an annular chamber about a center post and an annular piston-forming member reciprocally slidable in the annular chamber to dispense flowable material outwardly annularly about the center post.

To at least partially overcome these disadvantages of previously known devices, the present invention also provides a dispenser for flowable materials, particularly pastes and high viscosity flowable materials, with a novel construction including an annular piston-forming element slidably received in an annular compartment of a piston chamber-forming member.

To at least partially overcome these disadvantages of previously known devices, the present invention further provides a pump assembly for dispensing flowable material with two stages of pressurization.

A preferred embodiment of a pump assembly in accordance with the present invention comprises two basic elements: a piston chamber-forming body and a piston-forming element.

The piston chamber-forming member or body preferably defines a chamber having a radially inwardly directed chamber wall. The body includes a center post member affixed to the body and extending coaxially within the chamber from an inner end of the chamber outwardly. The inner end of the chamber is in communication with a source of fluid and an inlet one-way valve is provided to permit fluid flow outwardly into the inner end of the chamber but to prevent fluid flow inwardly out of the chamber. An annular compartment is defined in the chamber between the chamber wall and the post member. An annular piston-forming element or piston is received in the annular compartment with engagement between the piston and the chamber wall preventing fluid flow outwardly therebetween and engagement between the piston and the post member providing an outlet one-way valve which provides for fluid flow outwardly therepast yet prevents fluid flow inwardly. With reciprocal sliding of the piston into the body within the annular compartment of the chamber, fluid is drawn into the chamber in an outward withdrawal stroke and is dispensed from the chamber in an inward retraction stroke. Fluid dispensed from the compartment is dispensed via a central passageway extending coaxially through the piston annularly about the post member.

Flowable material is drawn from the reservoir by the outward movement of the piston from the reservoir, past the inlet one-way valve device and into the chamber. In subsequent inward movement, the chamber is pressurized and the inlet one-way valve device prevents the flowable material from flowing back into the reservoir. An outlet one-way valve allows flowable material in the chamber to pass outwardly therepast when the chamber is pressurized, such that flowable material is pumped out from the chamber in inward movement.

The pump assembly is advantageous for fluids having viscosities in excess of 1000 cP, more preferably in excess of 2000 cP, 4000 cP or 5000 cP.

In one embodiment, the chamber is preferably cylindrical and of a constant diameter and has, separate from the piston chamber-forming body and the piston-forming element, a one-way inlet valve between an inner end of the chamber and the reservoir. In another embodiment, the chamber is a stepped chamber with an inner cylindrical chamber of a different diameter compared to an outer cylindrical chamber and the stepped cylinder configuration is used to provide the inlet one-way valve without the need for a one-way valve separate from the piston chamber-forming body and the piston-forming element.

Preferably, the pump is coupled to a replaceable fluid containing reservoir. After exhaustion of the flowable material contained in the reservoir, the reservoir is replaced, preferably together with a new pump assembly attached. Preferably both the reservoir and the pump are formed entirely of plastic so as to permit easy recycling of the plastic parts.

As used in the application, the term fluid includes flowable materials which flowable materials include but are not limited to liquids.

In a first aspect, the present invention provides a fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an inner end of the post member to a distal outer end of the post member whereby an annular compartment is defined within the chamber between the chamber wall and the post member, a one-way valve across the inlet end of the chamber permitting fluid flow outwardly but preventing fluid flow inwardly, an annular piston-forming element coaxially slidably received in the annular compartment for reciprocal movement between a retracted position and an extended position with the post member received in a central passageway through the piston-forming element and the chamber wall radially outwardly of the piston-forming element, engagement between the piston-forming element and the chamber wall preventing fluid flow therebetween outwardly, a one-way outlet valve provided by engagement between the post member and the passageway preventing fluid flow inwardly therepast but permitting fluid flow outwardly therepast, wherein sliding of the piston-forming element inwardly relative the piston chamber-forming member reduces the volume of the compartment between the inlet one-way valve and the outlet one-way valve such that fluid is forced to pass outwardly in the passageway past the outlet one-way valve annularly about the post member, and wherein sliding of the piston-forming element outwardly relative the piston chamber-forming member fluid draws fluid past the one-way valve outwardly into the compartment.

Preferably, in accordance with the first aspect, there is provided further at an outer end of the passageway a radially inwardly extending discharge flange is provided which is outwardly from the distal outer end of the post member and extends radially inwardly of the distal outer end of the post member, a discharge outlet on the discharge flange, a discharge chamber is defined within the passageway outward of the outlet one-way valve between the post member and the outer end of the discharge flange, wherein sliding of the piston-forming element inwardly relative the piston chamber-forming member simultaneously (a) reduces the volume of the compartment between the inlet one-way valve and the outlet one-way valve such that fluid is forced to pass outwardly in the passageway past the outlet one-way valve annularly into the discharge chamber and (b) reduces the volume in the discharge chamber such that fluid is forced from the discharge chamber out the discharge outlet, and more preferably, wherein sliding of the piston-forming element outwardly relative the piston chamber-forming member fluid also draws atmospheric air and any fluid in the discharge outlet inwardly through the discharge outlet into the discharge chamber.

In another aspect, the present invention provides a fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member having an inner end and a distal outer end, the inner end of the post member secured to the piston chamber-forming member with the post member extending along the axis coaxially of the chamber outwardly from the inner end of the post member to the distal outer end of the post member, the post member having a radially outwardly directed side surface, an annular compartment defined within the chamber between the chamber wall and the side surface of the post member, a one-way inlet valve across the inlet end of the chamber permitting fluid flow outwardly but preventing fluid flow inwardly, an annular piston-forming element having a central passageway extending coaxially through the piston-forming element from an inner end of the passageway to an outer end of the passageway with the outer end of the passageway forming a discharge opening, the passageway having a radially inwardly directed side surface, the annular piston-forming element having a radially outwardly directed side surface, the annular piston-forming element coaxially slidably received in the annular compartment for reciprocal movement between a retracted position and an extended position with the post member received in the passageway and the chamber wall radially outwardly of the outwardly directed side surface of the piston-forming element, engagement between an annular portion of the outwardly directed side surface of the piston-forming element and the chamber wall preventing fluid flow therebetween outwardly, engagement between an annular portion of the radially outwardly directed side surface of the post member and an annular portion of the radially inwardly directed of the side surface of the passageway preventing fluid flow inwardly therepast but permitting fluid flow outwardly therepast, one of the annular portions being: (a) resilient to deflect when pressure on an inner side thereof exceeds pressure on an outer side thereof to permit fluid flow outwardly therepast and (b) biased when deflected to return towards an unbiased condition in which engagement between the annular portions prevents fluid flow outwardly, wherein sliding of the piston-forming element inwardly relative the piston chamber-forming member pressurizes fluid in the compartment inwardly of the piston-forming element to deflect the deflectable one of the annular portions such that fluid passes outwardly between the annular portions and outwardly in the passageway to exit the discharge outlet, and wherein sliding of the piston-forming element outwardly relative the piston chamber-forming member fluid draws fluid past the one-way inlet valve outwardly into the compartment.

BRIEF DESCRIPTION OF THE DRAWINGS

Further objects and advantages of the invention will appear from the following description taken together with the accompanying drawings in which.

DETAILED DESCRIPTION OF THE DRAWINGS

Figure 2:
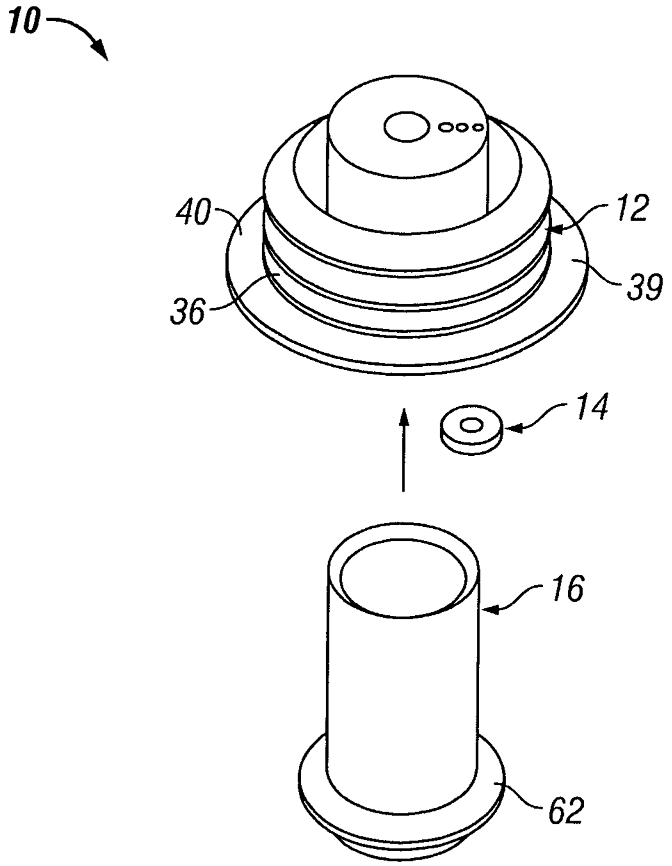
FIG. 2 is a partially exploded perspective view of a first preferred embodiment of the pump assembly shown in FIG. 1.
Figure 3:
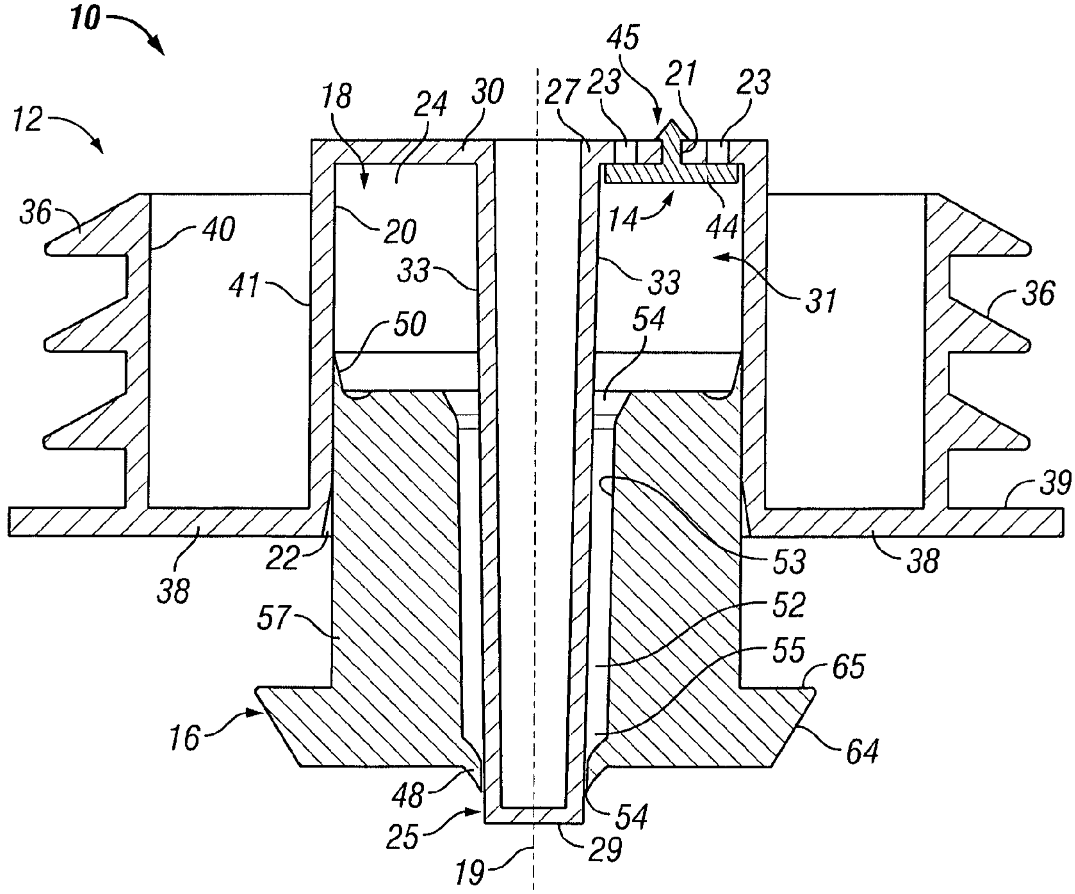
FIG. 3 is a cross sectional side view of an assembled pump assembly of FIG. 2 showing the first embodiment of a pump assembly in accordance with the present invention.

Reference is made first to FIGS. 2 and 3 which show a pump assembly generally indicated 10. Pump assembly 10 is best shown in FIG. 2 as comprising three principle elements, a piston chamber-forming member or body 12, a one-way valve 14 and a piston-forming element or piston 16.

The body 12 has an inner cylindrical portion 41 defining a cylindrical chamber 18 therein disposed about a central axis 19. The chamber 18 has a radially inwardly directed chamber wall 20, an inner inlet end 24, and an outer open end 22. The inner inlet end 24 of the chamber is closed by an end wall 30 of the body 12, however, with the end wall 30 having fluid inlet openings 23 therethrough providing communication with a source of fluid, to be described later as, for example, a reservoir 26 shown in FIG. 1.

Body 12 carries a center post member 25 secured to the end wall 30 of body 12 and extending coaxially centrally of the chamber 18 about the axis 19. As seen, the center post member 25 has an inner end 27 fixed to the end wall 30 and the center post member 25 extends outwardly from the end wall 30 coaxially about the axis 19 to a distal outer end 29. The post member 25 has a radially outwardly directed side surface 33, which is circular in cross-section normal to the central axis 19.

An annular compartment 31 is defined within the chamber 18 between the chamber wall 20 and the side surface 33 of the post member 25.

The one-way valve 14 is provided on the end wall 30 of body 12 at the inner inlet end 24 of the chamber 18 to permit fluid flow outwardly through the inlet openings 23 that is from a fluid source such as a reservoir into the chamber 18 but prevents fluid flow inwardly back to the reservoir. As best seen in FIG. 2, the end wall 30 has an aperture 21 therethrough proximate the inlet openings 23. The one-way valve 14 is best shown in FIG. 2 as having a central stem carrying at an outer end a flexible circular flap 44 and at the inner end an enlarged button 45. With the button 45 on an inner side of the end wall 30, the stem passes through the aperture 21 and locates the flap 44 on the outer side of the end wall 30 overlying the fluid inlet openings 23. The circumferentially outer periphery of the circular flap 44 is free to bend outwardly and thus permit outward flow of fluid from the reservoir 26 into chamber 18 when the pressure in the chamber is less that the pressure in the reservoir. When the pressure in the chamber 18 is greater than the pressure in the reservoir the circular flap 44 is urged into the end wall 30 about the inlet openings 23 preventing fluid flow from the chamber 18 inwardly back to the reservoir.

The piston 16 is annular in shape between a radially outwardly directed side surface 57 and a central passageway 52 extending coaxially through the piston 16. The passageway 52 extends axially from an inner end 54 of the passageway 52 to an outer end 55 of the passageway 52 with the outer end 55 of the passageway forming a discharge opening generally indicated 54. The passageway 52 has a radially inwardly directed side surface 53. The annular piston 16 is coaxially slidably received in the annular compartment 31 of the chamber 18 for reciprocal movement between a retracted position and an extended position with the post member 25 received in the passageway 52 and the chamber wall 18 radially outwardly of the outwardly directed side surface 57 of the piston 16.

The piston 16 carries an annular sealing disc 50 which extends outwardly from the side surface 57. The annular sealing disc 50 is sized to circumferentially engage the chamber wall 20 so as to substantially prevent fluid flow therebetween inwardly and outwardly therepast. In this regard, the sealing disc 50 may preferably, when unbiased, extend radially outwardly farther than the remainder of the side surface 57 as, in effect, to provide a radially outwardly directed surface preferably rounded which engages the chamber wall 20.

A resilient annular flexing disc 48 extends radially inwardly from the radially inwardly directed side surface 53 of the passageway 52. The flexing disc 48 is sized to circumferentially engage the cylindrical radially outwardly directed side surface 33 of the post member 25. The flexing disc 48 is extends radially inwardly with an elastically deformable edge-forming outward annular portion engaging an inward annular portion of the radially outwardly directed side surface 33 of the post member 25 circumferentially thereabout to form a one-way outlet valve. The flexing disc 48 extends radially inwardly and axially outwardly and has an inherent bias biasing it radially inwardly into engagement with the side surface 33 of the post member 25. The bias of flexing disc 48 substantially prevents fluid flow in the chamber 18 past the flexing disc 48 in an inward direction, however, the flexing disc 48 permits fluid flow in the chamber 18 past the flexing disc 48 in an outward direction by the flexing disc 48 elastically deforming against its inherent bias away from side surface 33 of the post member 25. The flexing disc 48 is elastically deformed away from side surface 33 when the pressure on an axially inner side of the flexing disc 48 is sufficiently greater that the pressure on an axially outer side of the flexing disc 48.

Flexing disc 48 is deformed when the pressure differential across it, that is, the difference between the pressure on its inner side and pressure on its outer side, is greater than a maximum pressure differential which the flexing disc 48 can withstand without deflecting. When the pressure differential is greater than this maximum pressure differential, the disc 48 deforms and fluid flows outwardly therepast. When the pressure differential reduces to less than this maximum pressure differential, the flexing disc 48 returns to its original shape substantially forming a seal with side surface 33 of the post member 25.

It is to be appreciated that engagement between an annular portion of the radially outwardly directed side surface 33 of the post member 25 and the flexing disc 48, as an annular portion of the radially inwardly directed of the side surface 53 of the passageway 52, prevents fluid flow inwardly therepast but permits fluid flow outwardly therepast.

The annular piston 16 is axially slidably received in the annular compartment 31 of the chamber 18 for reciprocal sliding movement inwardly and outwardly relative the body to pump fluid from the reservoir 26 through piston 16.

A circular engagement disc 64 is provided on the piston 16 extending radially outward. Engagement disc 64 has a radius greater than the radius of the chamber wall 20 such that an axially inwardly directed stopping shoulder 65 engages a rim 38 about outer end 22 of the body 12 to limit axial inward movement of piston 16.

Figure 4:
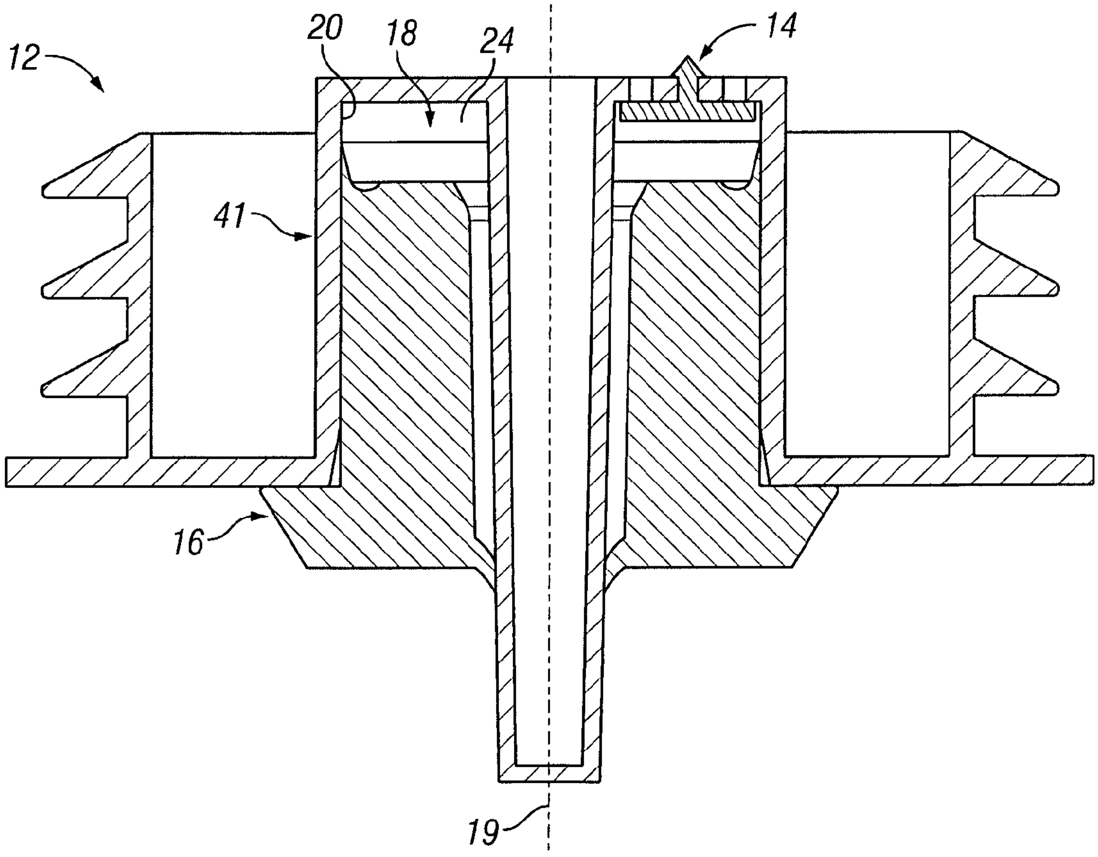
FIG. 4 is a cross sectional side view similar to FIG. 3 but with the dispensing piston in a fully retracted position.
Figure 5:
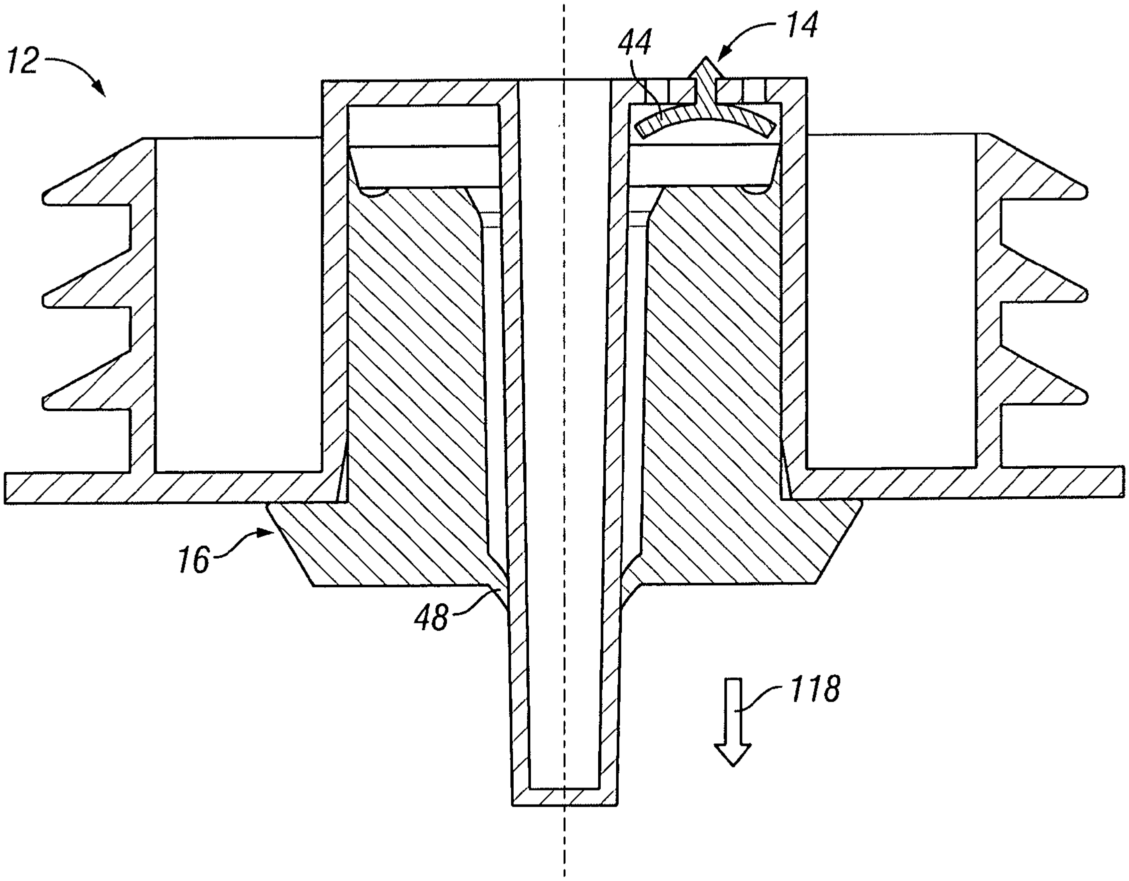
FIG. 5 is a cross sectional side view similar to FIG. 3 but with the dispensing piston in a partially withdrawn position in a withdrawn stroke.
Figure 6:
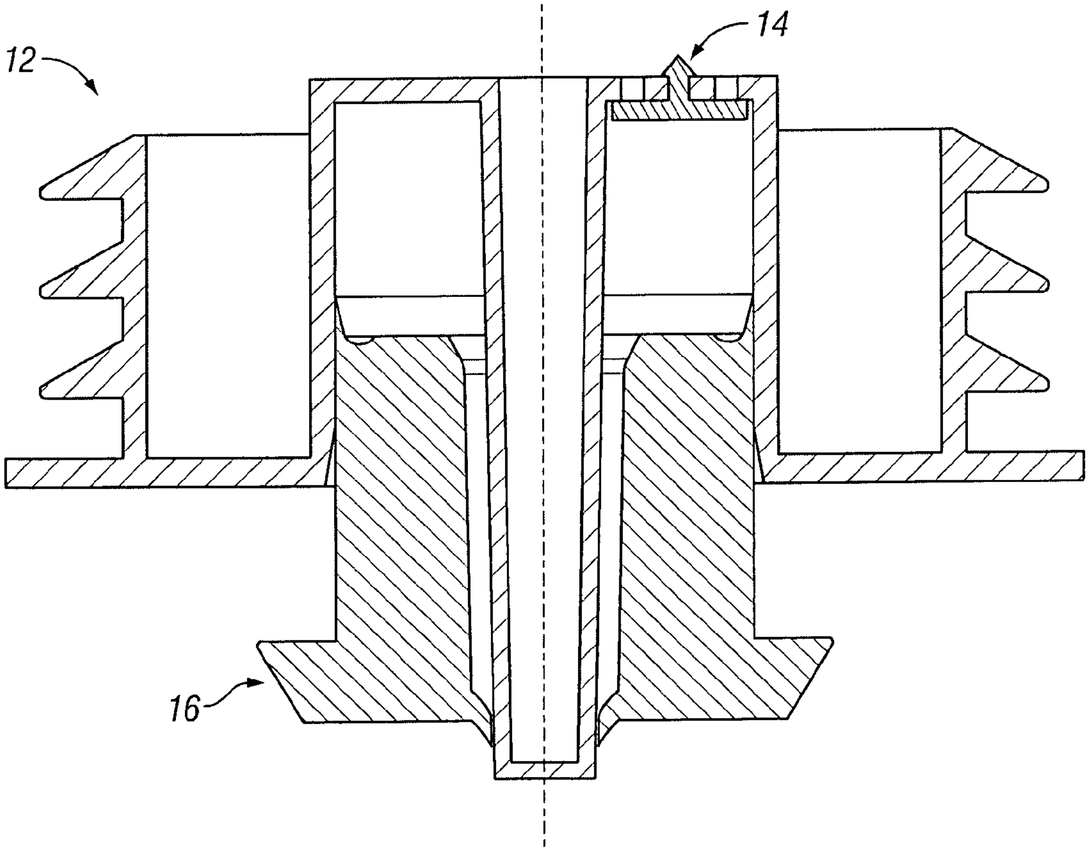
FIG. 6 is a cross sectional side view similar to FIG. 3 but with the dispensing piston in a fully withdrawn position.
Figure 7:
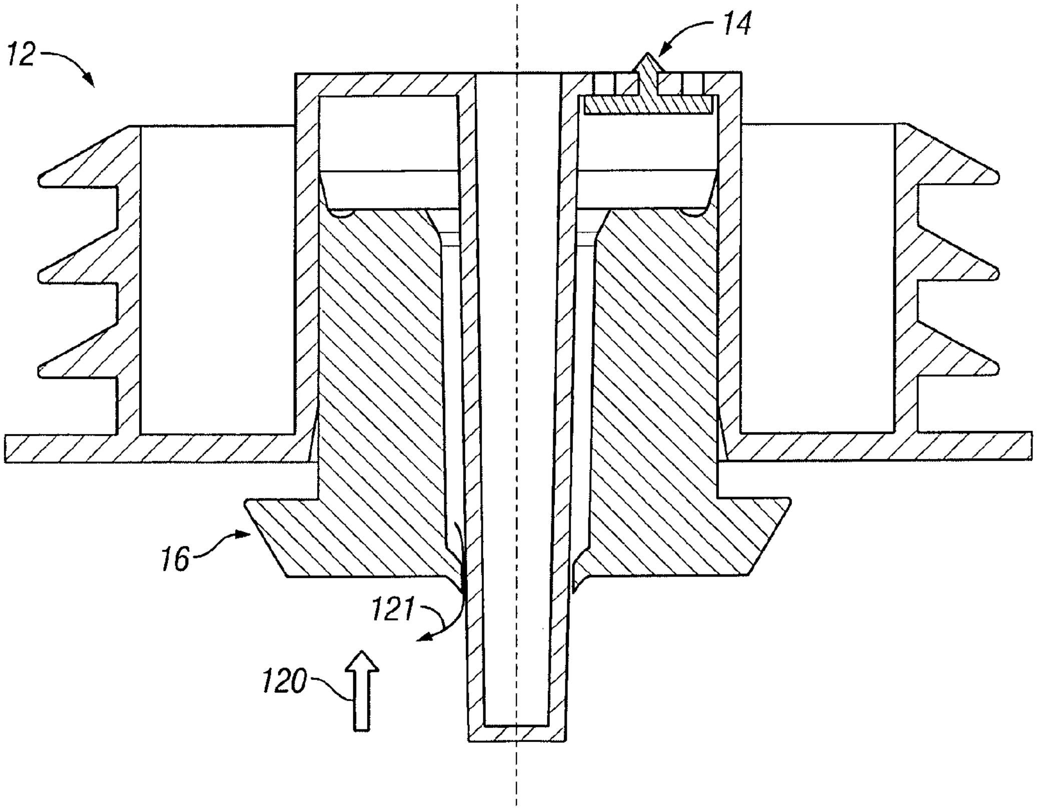
FIG. 7 is a cross sectional side view similar to FIG. 3 but with the dispensing piston in a partially retracted position in a retraction stroke.

Operation of the pump assembly 10 in a cycle of operation is now described with particular reference to FIGS. 4, 5, 6 and 7. FIG. 4 shows the pump assembly with piston 16 in a fully retracted position. FIG. 6 shows the pump assembly with piston 16 in a fully withdrawn position. FIG. 5 shows the pump assembly with piston 16 during a withdrawn stroke moving in the direction of arrow 118 from the retracted position of FIG. 4 to the withdrawn position of FIG. 6. FIG. 7 shows the pump assembly with piston 16 during a retraction stroke moving in the direction of arrow 120 from the withdrawn position of FIG. 6 to the retracted position of FIG. 4. Repeated pumping action results by repeatedly cycling the pump assembly through the positions in sequence of FIGS. 4, 5, 6 and 7.

During the withdrawal stroke of FIG. 5, the withdrawal of the piston 16 causes the inlet one-way valve 14 to open with fluid to flow into chamber 18 past the flap 44. In the withdrawal stroke, the flexing disc 48 forming the outlet one-way valve remains substantially undeflected and assists in creating a vacuum in chamber 18 to open flap 44 and draw fluid into chamber 18 past flap 44.

During the retraction stroke of FIG. 7, the return of piston 16 pressurizes fluid in chamber 18 between the piston 16 and inlet one-way valve 14. This pressure urges flap 44 of the inlet one-way valve 14 to a closed position abutting end wall 30. As a result of this pressure in the chamber 18, flexing disc 48 deflects its periphery as indicated in FIG. 7 so as to come out of sealing engagement with the side surface of the post member 25 and permit fluid to flow past flexing disc 48 and out of chamber 18 via the discharge outlet 54 annularly between the outer end of the passageway 52 between the post member 25 as shown by arrow 121.

Figure 1:
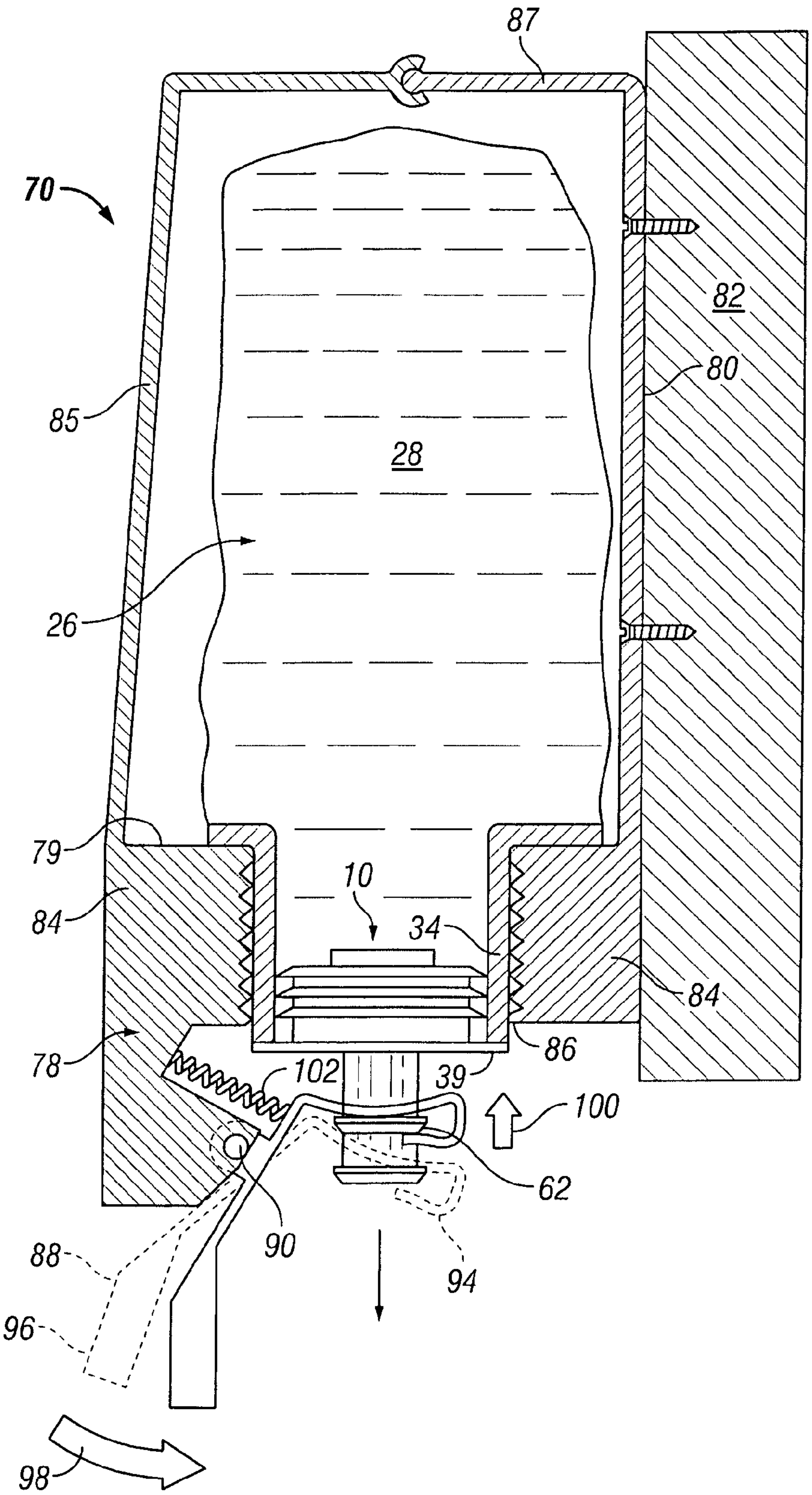
FIG. 1 is a partially cut away side view of a preferred embodiment of a fluid dispenser with the reservoir and pump assembly in accordance with the present invention.

Reference is now made to FIG. 1 which shows a liquid soap dispenser generally indicated 70 utilizing the pump assembly 10 and a reservoir 26 with pump assembly 10 inserted into neck 34 of the reservoir 26. As shown, the body 12 is adapted to be frictionally engaged into a cylindrical neck 34 of the fluid reservoir 26. In this regard as seen in FIG. 3, the body 12 is generally cylindrical in cross-section and symmetrical about its central axis 19. Body 12 has the inner cylindrical portion 41 defining the chamber 18 therein. Disposed coaxially about the inner cylindrical portion 41 and spaced radially outwardly therefrom is an outer cylindrical portion 40. The inner and outer cylindrical portions 41 and 40 are joined by a disc-like rim 38 extending radially outwardly about open end 22 of chamber 18. Sealing and gripping flanges 36 are provided about the outer cylindrical portion 40 to assist in frictionally engaging the inner surfaces of the reservoir neck 34 and form a fluid impermeable seal therewith. Rim 38 continues radially outwardly past flanges 36 as stop flange 39 which serves to limit insertion of body 12 into the reservoir neck 34.

Referring again to FIG. 1, dispenser 70 has a housing generally indicated 78 to receive and support the pump assembly 10 and reservoir 26. Housing 78 is shown with a back plate 80 for mounting the housing, for example, to a building wall 82. A bottom support plate 84 extends forwardly from the back plate to receive and support the reservoir 26 and pump assembly 10. As shown, bottom support plate 84 has a circular opening 86 therethrough. The reservoir 26 sits, supported on plate 79 with its neck 34 extending through opening 86 and secured in the opening as by friction fit, clamping and the like. A cover member 85 is hinged to an upper forward extension 87 of back plate 80, so as to permit replacement of reservoir 26 and its pump assembly 10.

Bottom plate 84 carries at a forward portion thereof an actuating lever 88 journalled for pivoting about a horizontal axis at 90. An upper end of lever 88 carries a hook 94 to engage engagement flange 62 and couple lever 88 to piston 16, such that movement of the lower handle end 96 of lever 88 from the dashed to the solid line position, in the direction indicated by arrow 98 slides piston inwardly in a retraction, pumping stroke as indicated by arrow 100. On release of lower handle end 96, a spring 102 biases the upper portion of lever 88 downwardly so that the lever 88 draws piston 16 outwardly to a fully withdrawn position as seen in the dashed lines in FIG. 1. Lever 88 and its inner hook 94 are adapted to permit manually coupling and uncoupling of the hook 94 as is necessary to remove and replace reservoir 26 and pump assembly 10.

In use of the dispenser 70, once exhausted, the empty reservoir 26 together with its attached pump 10 are removed and a new reservoir 26 and attached pump 10 are inserted into the housing. Preferably, the removed reservoir 26 and attached pump 10 is made entirely of recyclable plastic material which may easily be recycled without the need for disassembly prior to cutting and shredding. In the first embodiment each of the piston 16 and the body is a unitary element formed entirely of plastic preferably by injection molding.

While the preferred embodiment of FIG. 2 shows a generally cylindrical chamber 18 and piston 16 which have engagement surfaces as being circular in cross-section, complementary chambers and pistons of other symmetrical and non-symmetrical cross-sectional shapes may also be used.

Figure 8:
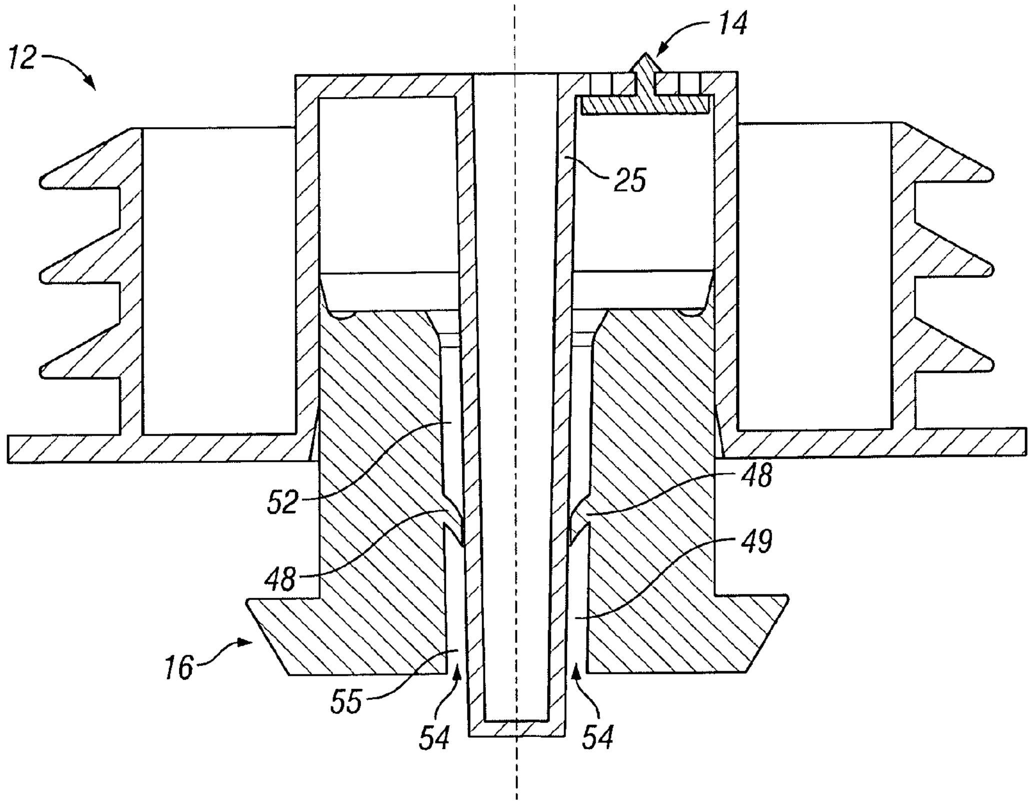
FIG. 8 is a cross-sectional side view of a second embodiment of a pump assembly in accordance with the present invention.
Figure 9:
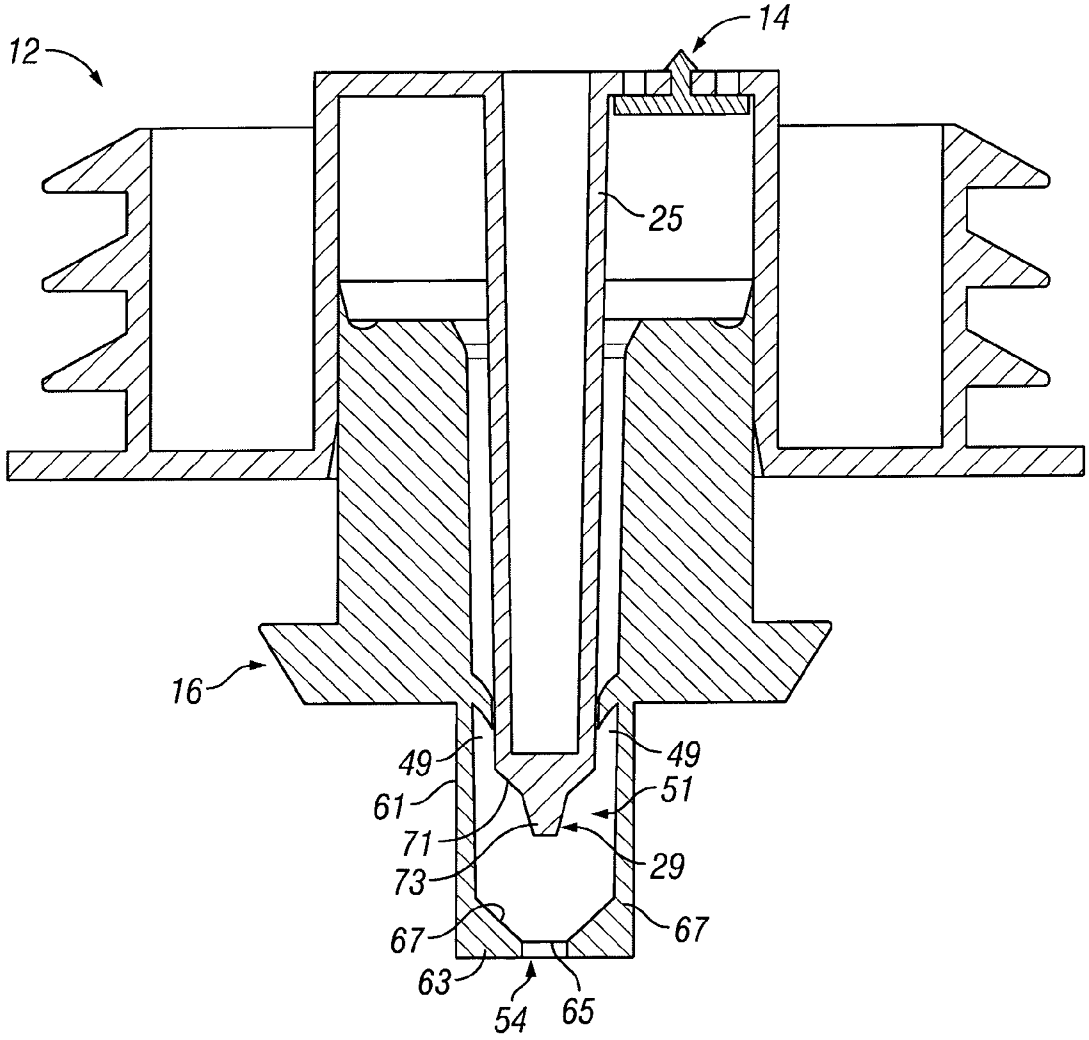
FIG. 9 is a cross-sectional side view of a third embodiment of a pump assembly in accordance with the present invention in a partially retracted position.

Reference is now made to FIGS. 8 and 9 which show second and third embodiments of pumps in accordance with the invention having an identical body 12 to that of the first embodiment in FIGS. 2 to 7 but modified pistons 16. In FIG. 8 and all the figures, similar reference numerals are used to indicate similar elements to those in the first embodiment of FIGS. 1 and 2.

FIG. 8 shows a second embodiment of a pump which is identical to the embodiment illustrated in FIG. 3 with the exception that the resilient annular flexing disc 48 has been located spaced inwardly from the outer end 55 of the passageway 52. With this arrangement in FIG. 8, upon the fluid flowing outwardly past the flexing disc 48, the fluid then flows through an outermost axially extending section 49 of the passageway 52 inwardly of the discharge outlet 54 which is now located at the outer end 55 of the passageway 52. This is believed to have the advantage of directing fluid dispensed annularly and downwardly about the post member 25 and reduce the tendency of the fluid to be directed or to spray radially outwardly.

Figure 10:
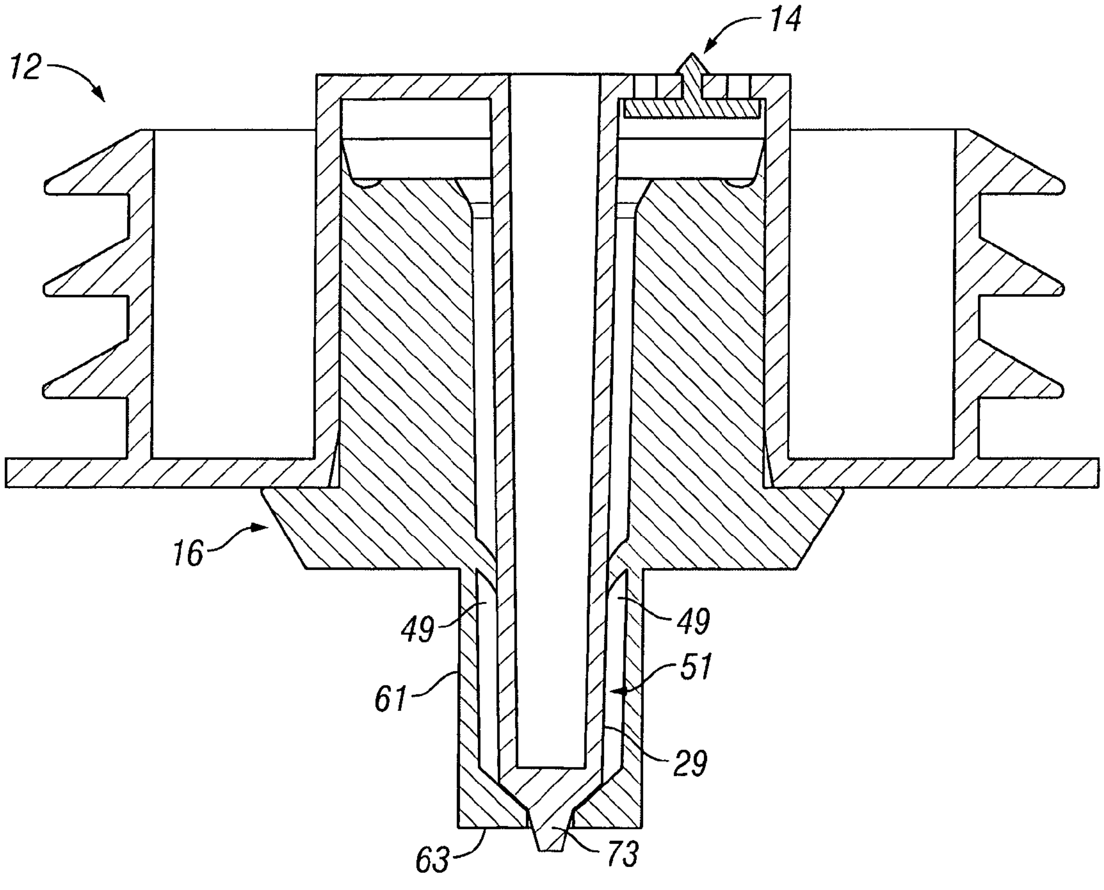
FIG. 10 is a cross-sectional side view of the embodiment of a pump assembly in FIG. 9 in a fully retracted position.

Reference is made to FIGS. 9 and 10 which shows a third embodiment which differs from the first embodiment of FIG. 3 in that the piston 16 has been modified to increase the axial length of the piston 16 by adding a tubular extension 61 and with the axially outer end of the piston provided with a radially inwardly extending end flange 63 located axially outwardly of the distal end 29 of the post member 25. This end flange 63 has a central opening 65 therethrough of a diameter less than the diameter of the distal end 29 of the post member 25 which opening serves as a discharge opening 54. The end flange 63 provides an axially inwardly directed shoulder 67 about the discharge opening 54 which shoulder 67 is in opposition to the axially outwardly directed surface 71 of the distal end 29 of the center post member 25. In the embodiment of FIG. 9, the fluid discharged outwardly past the flexing disc 48 flows through the axially extending section 49 of the passageway 52 annularly about the post member 25 and then radially inwardly of the distal end 29 of the post member 25 to exit the discharge outlet 54 through the end flange 65. The embodiment of FIG. 9 thus has the advantage of discharging the fluid through the discharge outlet 54 as a tubular stream rather than an annular discharge as was the case in the first and second embodiments shown in FIGS. 3 and 8, respectively.

In each of the first, second and third embodiments shown, for example, in FIGS. 3, 8 and 9, the flexing disc 48 may be provided on the side surface 53 of the passageway 52 anywhere between the inner end 54 and the outer end 55 of the passageway 52. In the embodiment of FIG. 9, the flexing disc 48 may preferably be provided as close as possible to the outer end 55 of the passageway.

In FIGS. 9 and 10, the distal end 29 of the piston member 25 includes a central plug 73 sized to extend through the discharge opening 54. About the plug 73, as best seen in FIG. 9, the distal end 29 of the piston member 25 is shown to have an outer annular portion 71 which is frustoconical. The axially inwardly directed surface 67 of the end flange 63 is shown to have a complementary frustoconical shape such that with movement axially inwardly from the position of FIG. 9 to the retracted position of FIG. 10, engagement between the frustoconical portion 71 of the post member 25 and the frustoconical surface 67 of end flange 63 will sealably close discharge outlet 54 against fluid flow inwardly or outwardly therethrough. Providing the pump assembly to assume such a condition with the discharge outlet 54 closed against fluid passage can be an advantageous fully retracted position in which the piston may be maintained as when the pump is attached to a fluid containing reservoir for handling shipping and storage before use or which the piston may assume as a rest position at the end of any cycle of operation as to assist in preventing dripping. While the dispenser shown in FIG. 1 has a fully withdrawn position as a rest position between cycles of operation, the dispenser of FIG. 1 may be configured to have a different spring bias the piston to the fully retracted position as a rest position. As well, with automated motor powered dispensers, the fully retracted position may be selected as the rest position.

As seen in FIG. 9, a discharge chamber 51 is defined within the passageway 52 open to the discharge outlet 54 about the post member 25 outward of the flexing disc 48 and including the axially extending section 49. In a retraction stroke of the piston 16 as from the position of FIG. 9 to the position of FIG. 10, fluid is pressurized in the chamber 18 so as to be discharged past the flexing disc 48 outwardly into the discharge chamber 51 and fluid in the discharge chamber 51 is further pressurized since with the axially inward sliding of the piston 16, the volume of the discharge chamber 51 reduces. Thus fluid in the discharge chamber 51 is forced outwardly through the discharge outlet 54. In the embodiment of FIGS. 9 and 10, there is a double pumping action or two phase pressurization with, firstly, a pressurization of fluid in the chamber 18 axially inwardly of the flexing disc 48 and, secondly, a pressurization of fluid in the discharge chamber 51 axially outwardly of the flexing disc 48. This dual pumping is particularly advantageous for dispensing viscous pastes and flowable materials.

In the embodiment of FIGS. 9 and 10, the discharge chamber 51 is useful in a withdrawal stroke after fluid has been discharged from the discharge outlet 54 to draw back fluid together with atmospheric air through the discharge outlet 54 into the discharge chamber 51 as the discharge chamber 51 increases in volume as the piston 16 moves towards the fully extended position. This draw back of fluid from the discharge outlet 54 can be advantageous so as to reduce build up of flowable material in the discharge outlet 54 and/or to reduce dripping from the discharge outlet 54.

In the embodiment of FIGS. 9 and 10, in each cycle of operation, the plug 73 will extend through the discharge outlet 54. This is advantageous to remove any flowable material which may remain in the discharge outlet 54, particularly flowable material which may have hardened or dried out if there has been some time since the last use of the pump assembly. The embodiment of FIGS. 9 and 10 include both the plug 73 and the frustoconical sealing surfaces. Either or both of these features may be provided or eliminated.

In respect of the first, second and third embodiments illustrated in FIGS. 3, 8 and 9, in a retraction stroke, fluid is discharge past the annular disc 48 annularly about the post member 25. In a withdrawal stroke, the flexing disc 48 slides axially outwardly in engagement with the side surface 33 of the post member 25 effectively providing a wiping action such that any fluid which adhered to the post member 25 is in the withdrawal stroke, wiped from the post member 25 and urged radially downwardly towards the distal end 29 of the post member aiding particularly in the case of the embodiments of FIGS. 3 and 8 in the detachment and discharge of the fluid downwardly from the post member 25.

Figure 11:
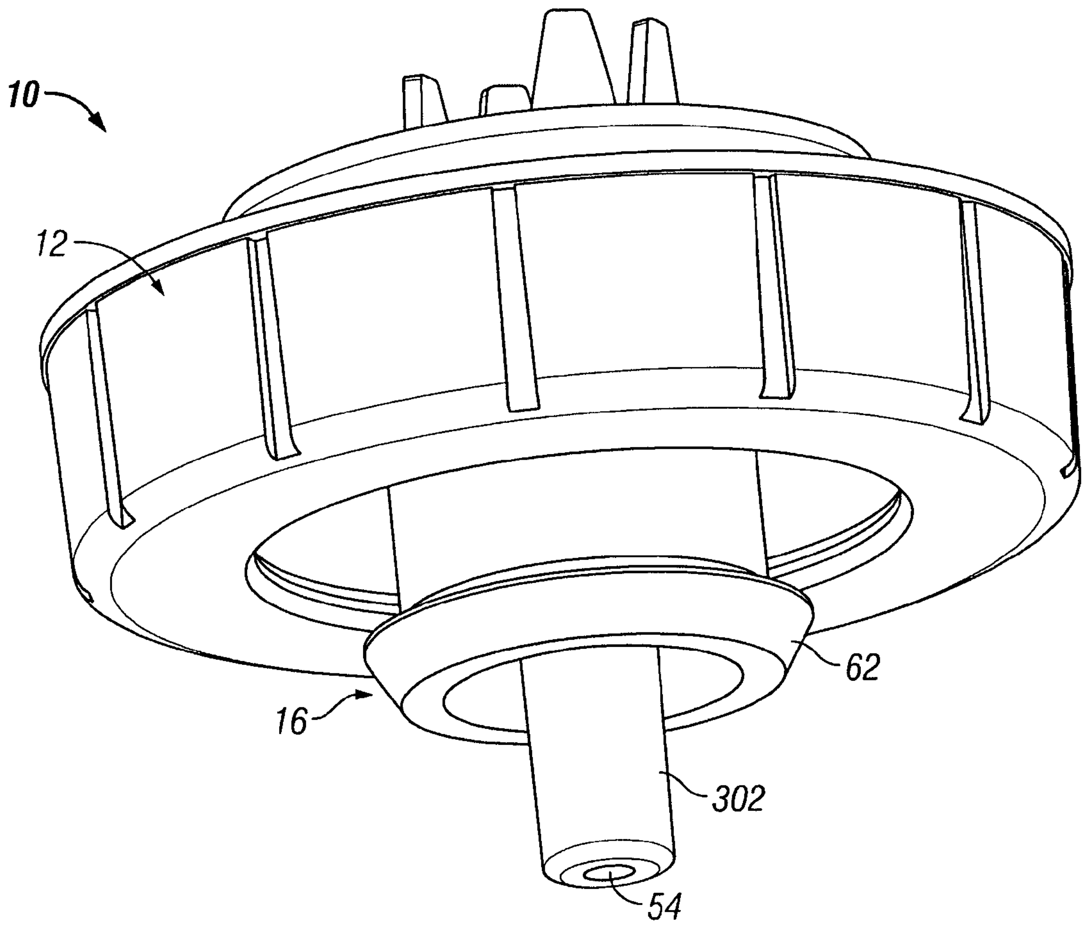
FIGS. 11 and 12 are pictorial bottom and top views, respectively, of a fourth embodiment of a pump assembly in accordance with the present invention.
Figure 12:
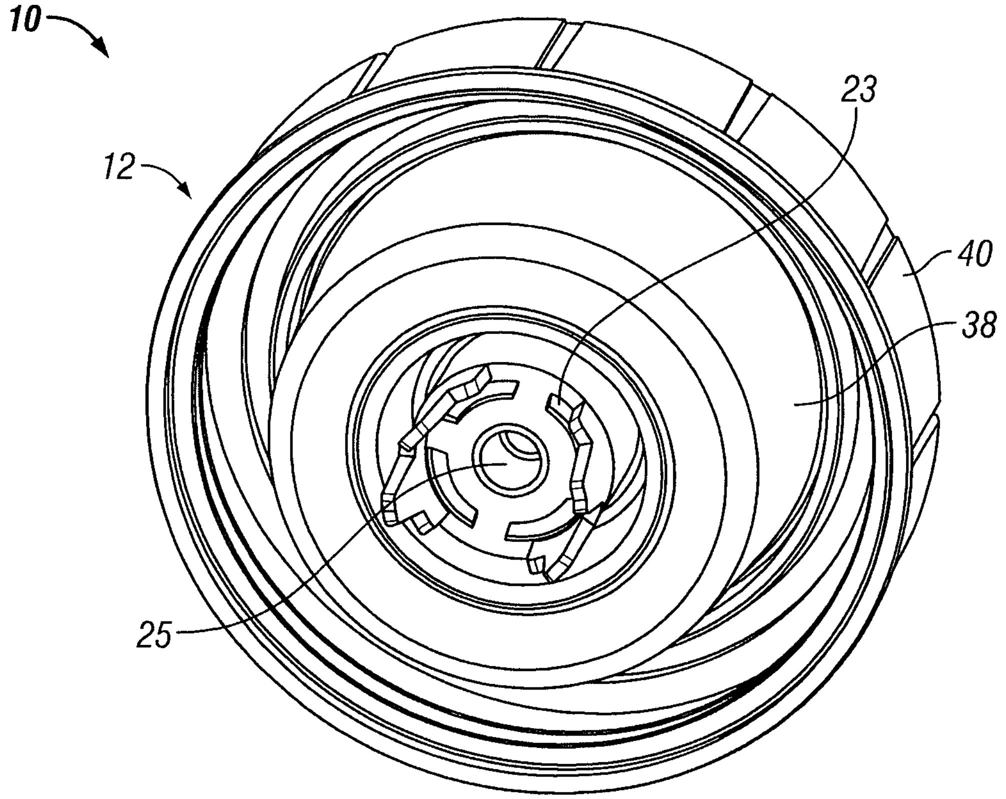
Figure 13:
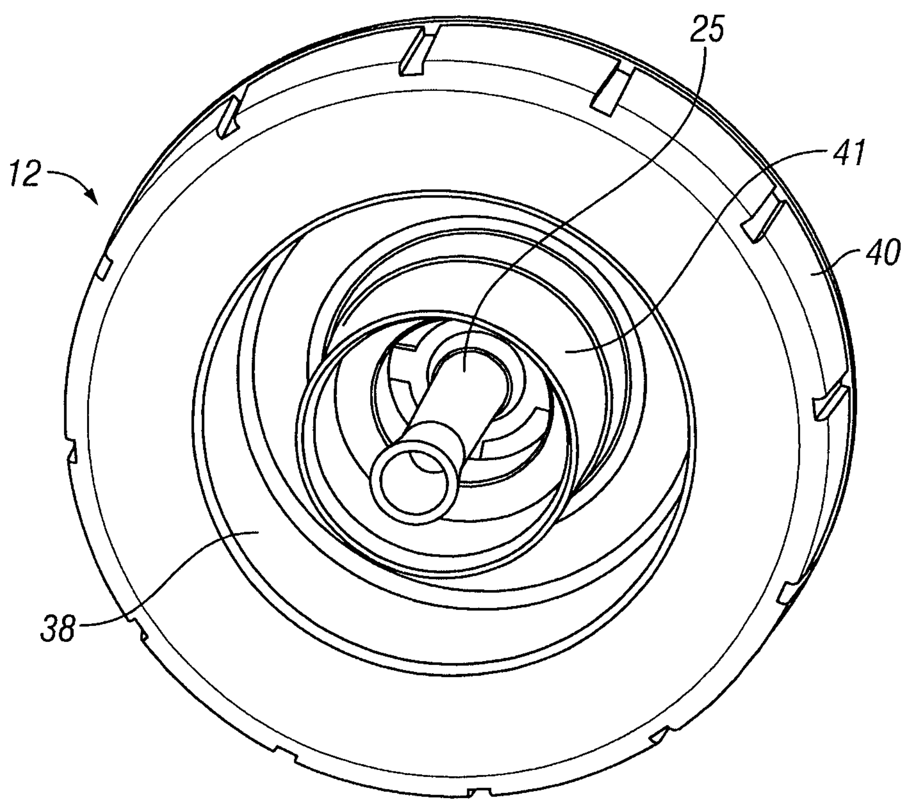
FIG. 13 is a bottom perspective view of the body of the pump assembly shown in FIGS. 11 and 12.
Figure 14:
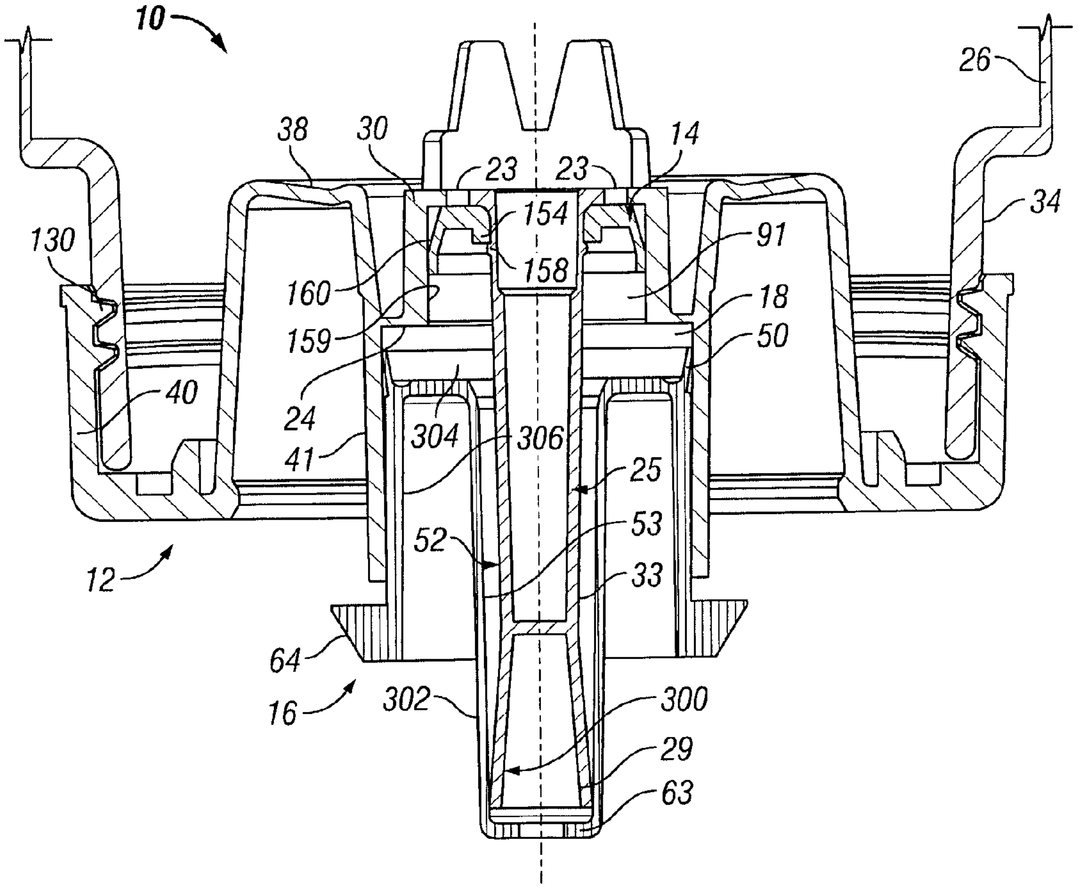
FIG. 14 is a cross-sectional side view of the pump assembly of FIG. 11 schematically shown as attached to a container.

Reference is made to FIGS. 11 to 14 showing a pump assembly in accordance with a fourth embodiment of the present invention. In these figures, FIG. 14 is a cross-sectional side view of the pump assembly 10 shown in FIG. 11 schematically shown as attached to a bottle reservoir 26.

As seen in FIG. 14, the pump assembly 10 is very similar in construction and functionality to the pump assembly illustrated in a third embodiment of FIGS. 9 and 10. In FIG. 14, the pump assembly 10 is shown secured to a plastic container 26 having a threaded neck 34. The body 12 has the inner cylindrical portion 41 forming the chamber 18 and disposed coaxially thereabout spaced therefrom the outer cylindrical portion 40. Inner and outer cylindrical portions 41 and 40 are joined by a bridging member 38 extending radially outwardly about the inlet end 24 of the chamber 18. The inner surfaces of the cylindrical portion 40 are provided with threads 130 for engagement with the threaded neck 34 of the container 26.

The container 26 is preferably collapsible such that it will collapse on dispensing fluid from the container 26, however, non-collapsible containers may be used with venting to prevent an excessive vacuum from developing in the container.

At the inner inlet end 24 of the chamber 18, the chamber 18 opens into a reduced diameter inner chamber 91 closed by the end wall 30 of the body 12. The end wall 30 has apertures 23 therethrough to provide communication between the inner chamber 91 and the interior of the container 26. The inlet one-way valve 14 is a resiliently flexible annular seal ring secured in the inner chamber 91 annularly about the post member 25. The valve 14 comprises an annular seal ring that has a radially inner side wall portion 154 which is secured to the post member 25 against axial movement by being received between the end wall 30 and an annular radially outwardly extending boss 158 on the post member 25. A radially outer arm 160 of the valve 14 engages the outer wall 159 of the inner chamber 91 and is adapted to flex radially inwardly to permit fluid flow outwardly from the container 26 but prevent fluid flow inwardly. The outer arm 160 of the valve 14 is biased outwardly into the outer wall 159 of the inner chamber 91. The valve 14 is preferably of a resilient elastomeric material and may be inserted by being slid inwardly over the distal end 29 of the post member 25.

FIG. 14 best shows that the radial outwardly directed side surface 33 of the post member 25 has an enlarged diameter outward annular portion indicated as 300 proximate the distal end 29 of the post member 25.

The piston 16 is shown as comprising an inner tubular portion 302 carrying at an outer end the end flange 63. The inner tubular portion 302 is joined by an inner annular bridging flange 304 to an outer cylindrical tube portion 306 which carries the sealing disc 50 and the engagement disc 64.

In FIG. 14, engagement between the enlarged diameter outward annular portion 300 of the radially outwardly directed side surface 33 of the post member 25 and an inward annular portion of the radially inwardly directed side surface 53 of the passageway 52 form the one-way outlet valve. In this regard, the inner tubular portion 302 of the piston 16 preferably is resilient and capable of deflecting radially outwardly away from the enlarged outward annular portion 300 when pressure is developed in the chamber 18 inwardly of the piston 16. The inner tubular portion 302 is preferably of an inherent inner diameter less than the diameter of the enlarged outward annular portion 300 such that the inner tubular portion 302 is inherently biased into contact with the enlarged outward annular portion 300. Operation of the pump assembly 10 illustrated in FIG. 14 is substantially identical to that as described with reference to the embodiments of FIGS. 9 and 10.

In the embodiment of FIG. 14, the body 12 is shown as being formed as integral member as by being injection moulded from plastic with the post member 25 integrally attached.

Figure 15:
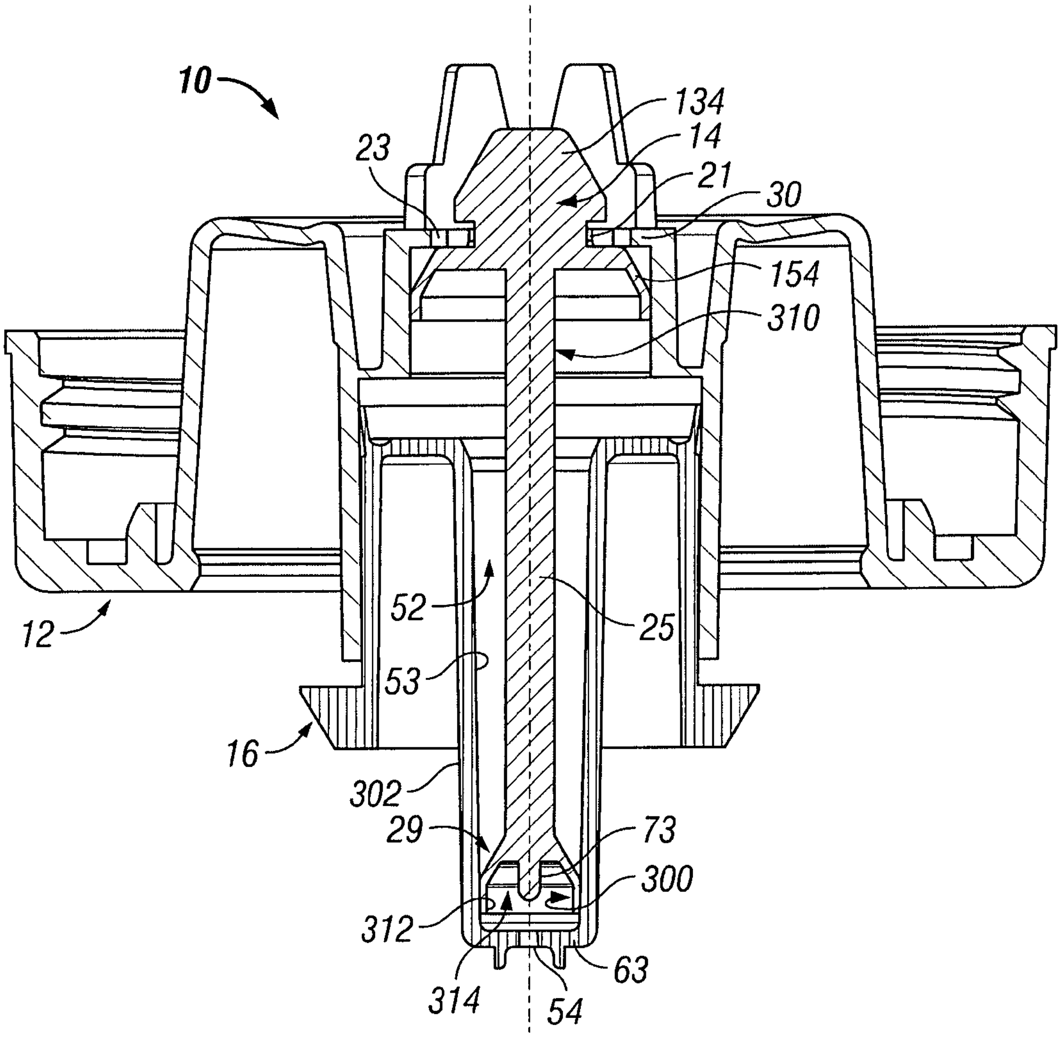
FIG. 15 is a cross-sectional side view of a fifth embodiment of a pump assembly in accordance with the present invention.

Reference is made to FIG. 15 which shows a fifth embodiment of a pump assembly 10 in accordance with the present invention. In the embodiment of FIG. 15, the piston 16 is identical to the piston shown in FIG. 14. In FIG. 15, the one-way valve 14 and the post member 25 are shown as being formed integrally as a center member 310 preferably from a resilient material. In this regard, the end wall 30 of the body has a central aperture 21 and the one-way valve 14 has a shouldered button 134 which is located in a snap-fit inside of aperture 21 on the end wall 30 of the body 12 locating an annular seal ring portion 154 inwardly of the end wall as an extension of a stem from the shouldered button 134. The post member 25 extends inwardly from the annular seal ring portion 154. The post member 25 carries at its distal end 29 an enlarged diameter annular portion 300 with the side surface 33 of the post member 25 about this enlarged annular portion 300 engaging with the side surface 53 of the passageway 52 in the tubular portion to provide the outlet one-way valve. As shown, the distal end 29 of the post member 25 has an annular circular wall 312 about a central blind opening 314 which opens outwardly. In the embodiment of FIG. 15, the resiliency of the enlarged annular portion 300 of the post member 25 and/or the resiliency of the inner tubular portion 302 of the piston 16 provides for biased engagement therebetween which provides the outlet one-way valve.

FIG. 15 shows an optional central plug 73 carried on the outer end 29 of the post member 25 extending coaxially centrally of the circular wall 312 but not extending axially outwardly as far as the circular wall 312. On moving the piston 16 inwardly in a retraction stroke, the end flange 63 will come to engage the circular wall 312 and with further retraction of the piston 16, inner portions of the circular wall 312 will deflect so as to permit the central plug 73 to extend into the outlet opening 54 to remove any fluid therein.

Figure 16:
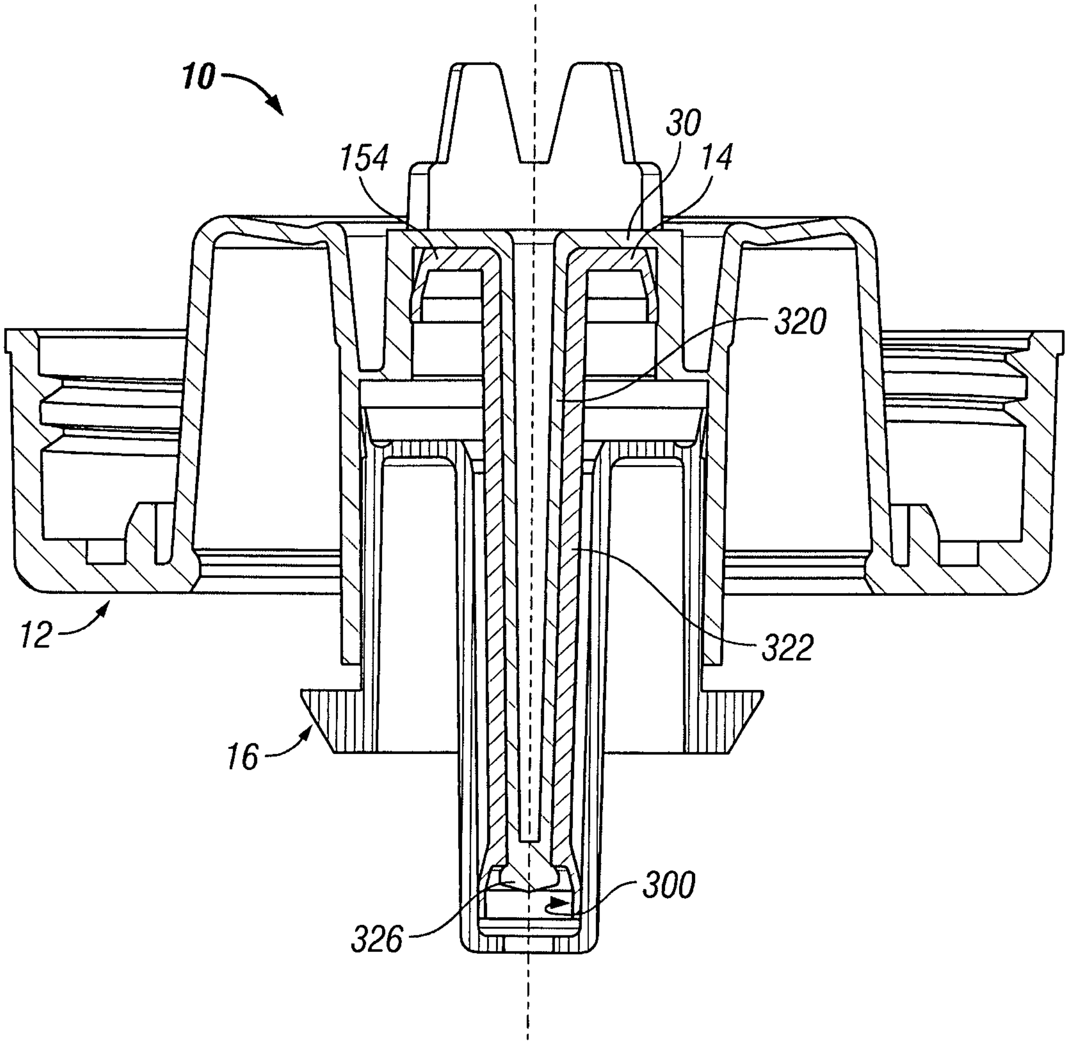
FIG. 16 is a cross-sectional side view of a sixth embodiment of a pump assembly in accordance with the present invention.

Reference is made to FIG. 16 which shows a sixth embodiment of a pump assembly 10 in accordance with the present invention. The embodiment of FIG. 16 is very similar to the embodiment illustrated in FIG. 15.

In FIG. 16, a central stem support 320 is shown as formed integrally with the remainder of the body 12 and fixed to the end wall 30. A resilient center tube 322 is provided coaxially disposed about the tubular support 320 and carries at an inner end an annular seal ring 154 forming the inlet one-way valve 14 and, at an outer end, an enlarged annular portion 300 which forms in part the outlet one-way valve. The center tube 322 is held onto the stem support 320 by reason of an enlarged button 326 at the outer end of the stem support 320.

Figure 17:
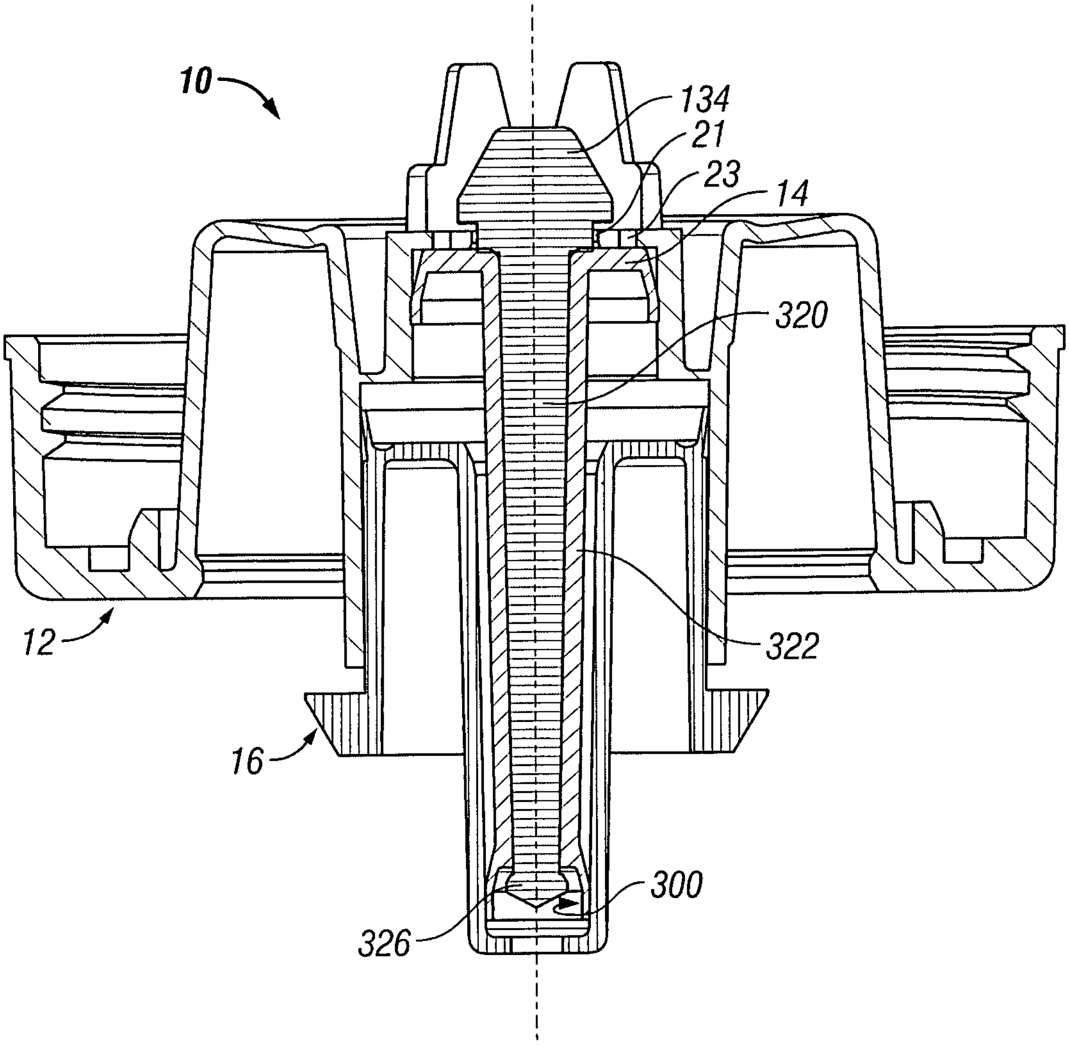
FIG. 17 is a cross-sectional side view of a seventh embodiment of a pump assembly in accordance with the present invention.

Reference is made to FIG. 17 which illustrates a seventh embodiment of a pump assembly 10 in accordance with the present invention. The embodiment of FIG. 17 is substantially the same as the embodiment illustrated in FIG. 16, however, the central stem support 320 is shown as being an element which is separate from the body 12 and secured via a shouldered button 134 in an aperture 21 in the end wall 30 of the body 12.

Figure 18:
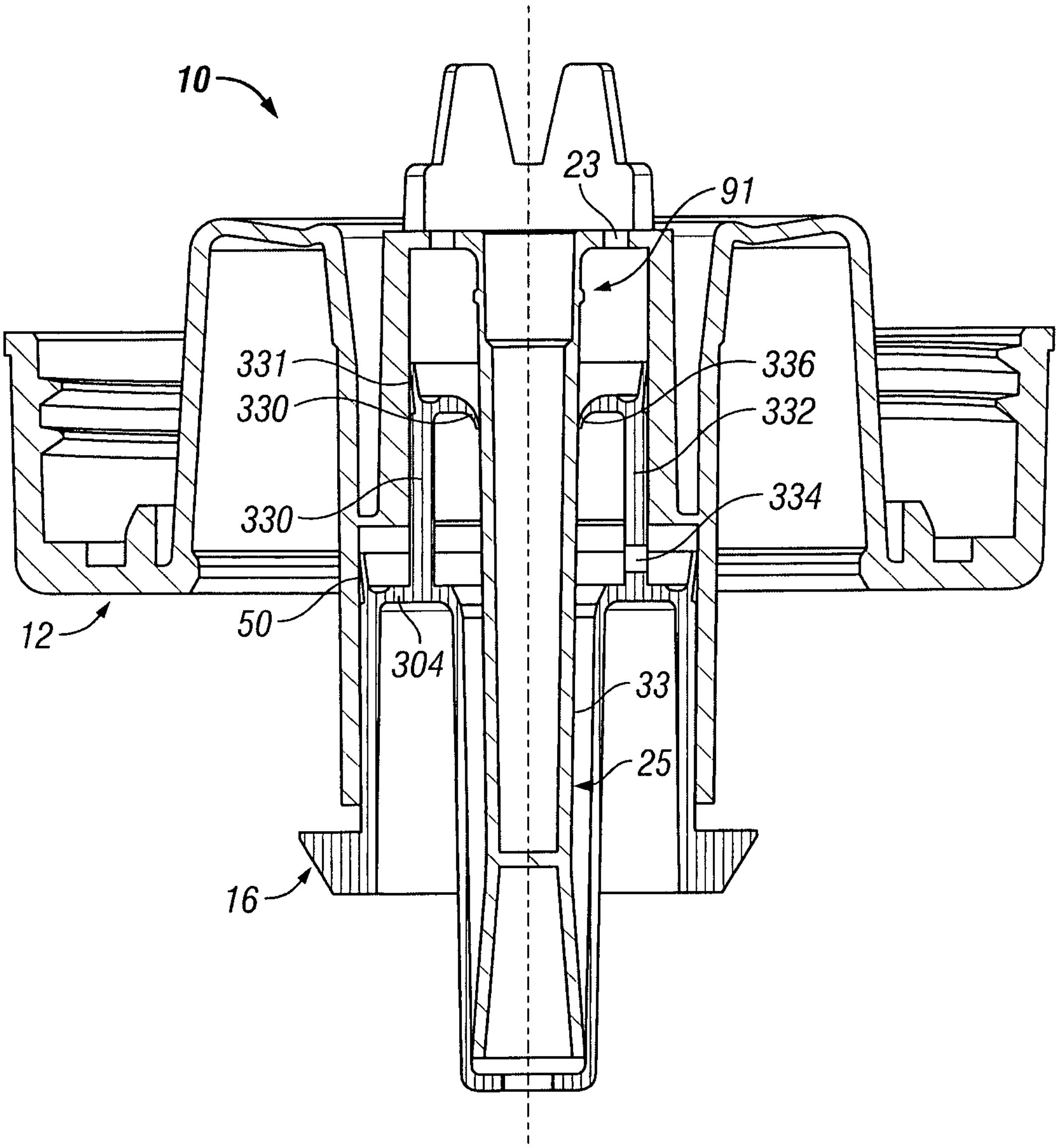
FIG. 18 is a cross-sectional side view of an eighth embodiment of a pump assembly in accordance with the present invention.

Reference is made to FIG. 18 which illustrates a pump assembly 10 in accordance with an eighth embodiment of the present invention. The embodiment of FIG. 18 is identical to the embodiment of FIG. 14 with an exception that the inlet one-way valve 14 in the embodiment of FIG. 14 has been eliminated and replaced by a radially extending inner annular flange 330 provided on the piston 16 to be slidable within the inner chamber 91. The inner chamber 91 is of a lesser diameter than the outer chamber 18. The piston 16 has an inwardly extending tubular extension 332 which joins the inner flange 330 to the bridging flange 304. One or more radially extending openings 334 are provided radially through the tubular extension 332.

The inner flange 330 engages the outer wall 159 of an inner chamber 91 with a sealing disc 331 similar to sealing disc 50 so as to substantially prevent fluid flow therebetween inwardly and outwardly therepast. The inner flange 330 carries as a radially inward annular portion thereof an elastically deformable edge portion 336 which engages the side surface 33 of the post member 25 circumferentially thereabout in a manner which permits fluid flow outwardly therepast yet prevents fluid flow inwardly therepast. This edge portion 336 is resilient and biased into engagement with the side surface 33 of the post member 25. The edge portion 336 may be elastically deformed away from the side surface 33 when pressure on an axially inner side is sufficiently greater than pressure on an axially outer side.

In a withdrawal stroke on moving the piston 16 outwardly, due to the increased diameter of the outer chamber 18 over that of the diameter of the inner chamber 91, fluid is drawn outwardly past the inner flange 330. On movement of the piston 16 inwardly, fluid is prevented from flowing inwardly past the inner flange 330. The embodiment of FIG. 18, in effect, provides the equivalent of the embodiment of FIG. 14, however, merely with two elements rather than the three elements in FIG. 14.

Figure 19:
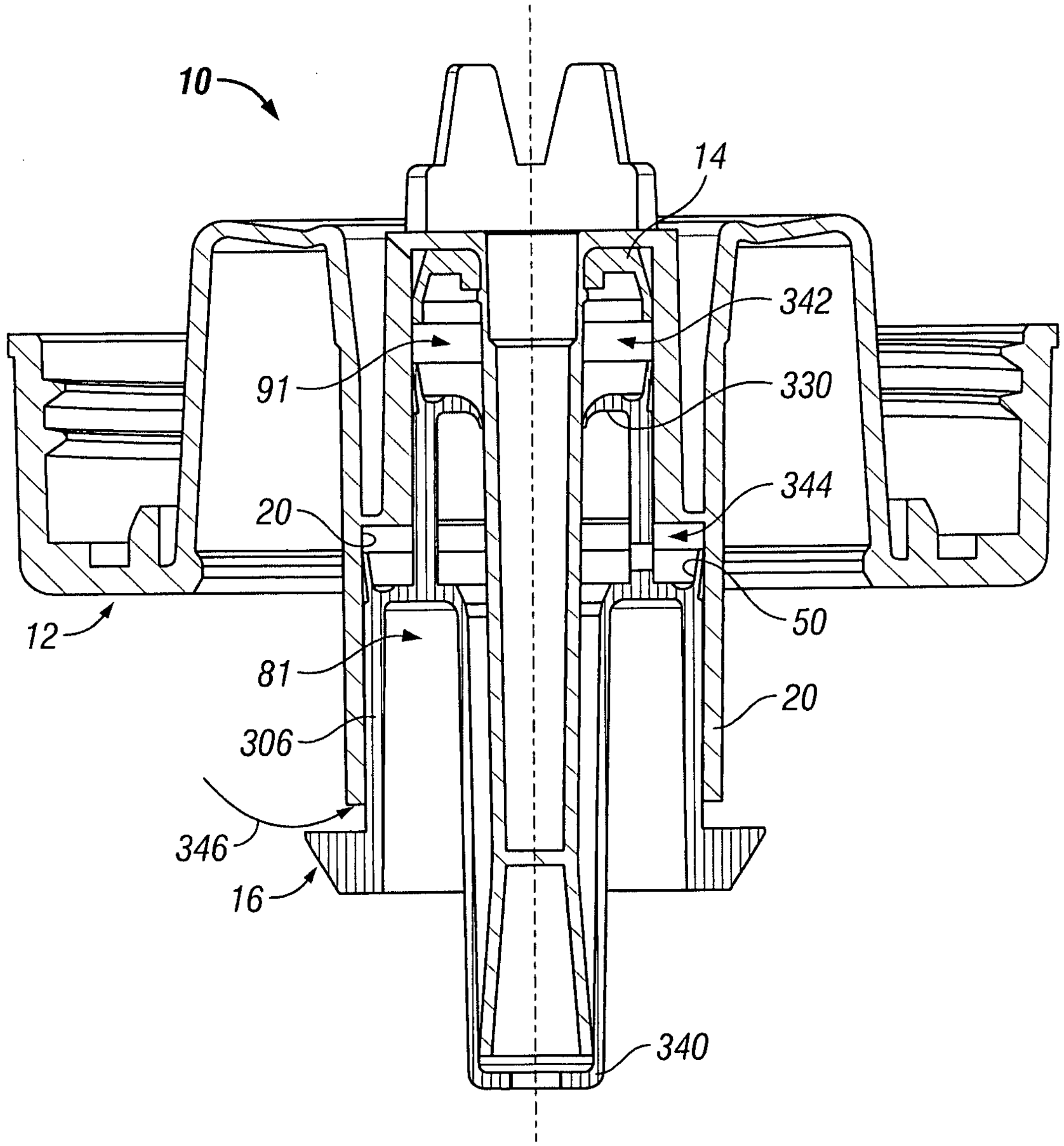
FIG. 19 is a cross-sectional side view of a ninth embodiment of a pump assembly in accordance with the present invention.

Reference is made to FIG. 19 which shows a ninth embodiment of a pump assembly 10 adapted for dispensing a mixture a flowable material, preferably limited to a liquid, and air. The embodiment of FIG. 19 is identical to the embodiment of FIG. 18 with two exceptions.

Firstly, in the embodiment of FIG. 19, a one-way valve 14 in the form shown in FIG. 14 is included and, secondly, a porous foam inducing member such as a screen 340 is provided fixed across the discharge outlet 54 inwardly of the end flange 63. In the embodiment of FIG. 19, the one-way valve 14 acts as a one-way inlet valve for liquid. The inner flange 330 acts as a one-way liquid outlet valve such that axial movement of the piston 16 will draw liquid from the reservoir into the inner chamber 91 and dispense fluid from the inner chamber 91 past the inner flange 330. Between the one-way valve 14 and the inner flange 330, an annular liquid compartment 342 is formed in the chamber 91. Between the inner flange 330 and the portions of the piston 16 outwardly therefrom, there is defined within the inner chamber 91 and the outer chamber 18 an annular air compartment 344. In a withdrawal stroke, atmospheric air is permitted to enter this air compartment 344, preferably, by arranging for the seal disc 50 and the engagement between the outer tubular portion 306 of the piston 16 and the inner surface of the wall 20 of the chamber 18 to permit air to flow therebetween into the air compartment 344 as indicated by the arrow 346. In a retraction stroke, air and liquid in the air compartment 344 are directed through the foam inducing screen 340 and out the discharge outlet 54 as a foamed mixture of air and liquid.

Air flow into the air compartment 344 in a withdrawal stroke may be assisted by axially extending air channels in the radially outer surface of the outer tubular portion 30 and suitable resiliency of the seal disc 50. Various other arrangements may be provided to permit atmospheric air to enter the air compartment 344.

Figure 20:
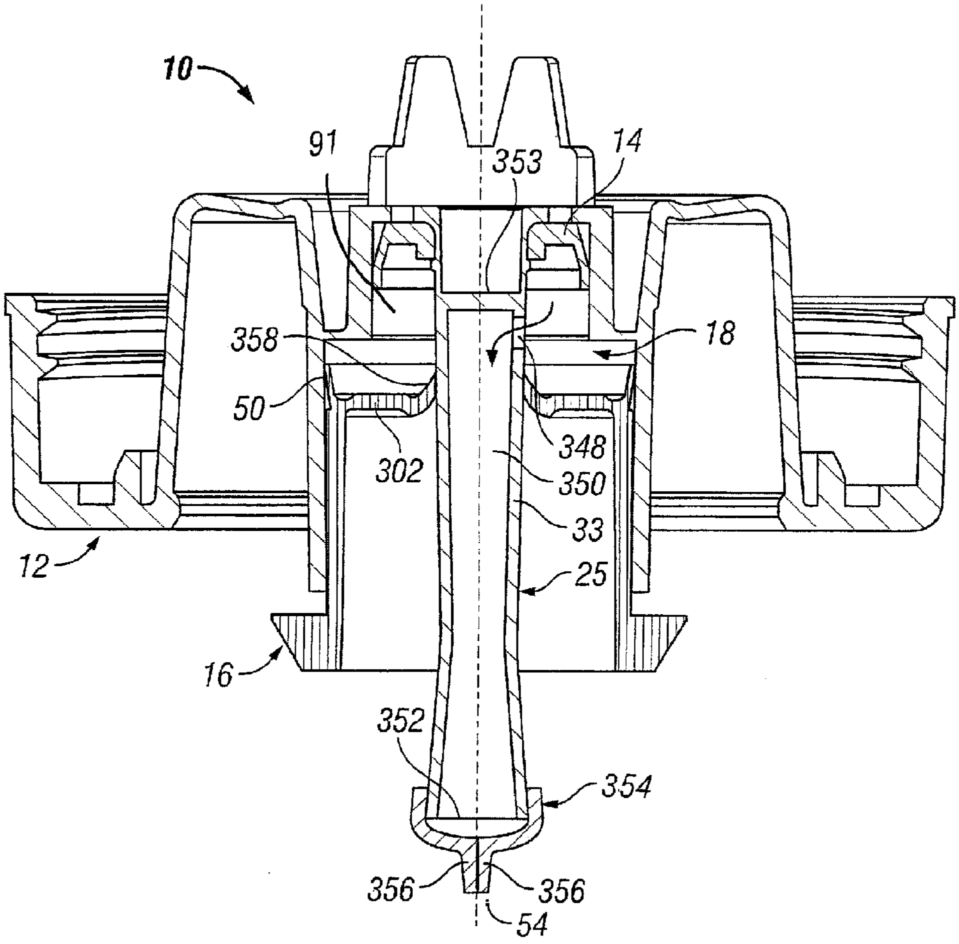
FIG. 20 is a cross-sectional side view of a tenth embodiment of a pump assembly in accordance with the present invention.

Reference is made to FIG. 20 which shows a tenth embodiment of a pump assembly 10 in accordance with the present invention. The embodiment in FIG. 20 has similarities to the embodiment shown in FIG. 14. The one-way inlet valve 14 is the same. The center stem 25 has been modified so as to provide an opening 348 radially through the wall of the post member 25 permitting passage of fluid from the chambers 91 and 18 into a central passageway 350 through the post member 25. The central passageway 350 is open at an outwardly opening end 352 of the post member 25 and closed at an inner blind end by a central disc 353. FIG. 20 shows a one-way duckbill valve 354 enclosing the outer open end 352 of the post member 25. This duckbill valve 354 is a known type which is made of resilient materials and which is biased closed but when pressure is provided on an inner side of the valve, two resilient bill-like members 356 which are normally biased into each other, are forced apart to permit fluid to pass outwardly therethrough as a discharge outlet 54. In FIG. 20, the piston 16 similar to that in FIG. 14 and is sealingly engaged with the wall 20 of the chamber 18 by the sealing disc 50, however, the piston 16 carries on its bridging flange 302 a disc 358 which engages the side surface 33 of the post member 25 to substantially prevent fluid flow inwardly or outwardly therein. In a withdrawal stroke of the piston 16, fluid is drawn inwardly past the inlet valve 14. On an outward stroke of the piston, fluid is forced from the chamber 18 through the opening 348 into the central passageway 350 of the post member 25 as indicated by the arrow and out the discharge outlet 54 through the duckbill outlet valve 354.

Reference is made to FIGS. 21 to 24 which illustrate an eleventh embodiment of a pump assembly 10 in accordance with the present invention. As with the other embodiments, the pump assembly 10 includes a body 12, a one-way valve 14 and a piston 16. In the embodiment of FIGS. 21 to 24, a tubular insert 410 is provided coupled to the body 12. The tubular insert 410 is coaxially about the axis 19 and includes, an annular sleeve 412 and a centre post 25 which are joined at an inner end via a radially extending flange 414. The flange 414 has openings 416 there through to permit the passage of fluid. The flange 414 is outwardly of the one-way valve 14 and does not interfere with the operation of the one-way valve 14. The sleeve 412 is a generally cylindrical sleeve which is disposed radially inside the inner cylindrical portion 41 of the body 12 and presents a radially inwardly directed wall 413. The sleeve 412 has a radially outwardly enlarged inner most portion which provides an axially outwardly directed shoulder 418. The inner cylindrical portion 41 of the body 12 has a cylindrical recess to receive the enlarged inner portion of the sleeve 412 and presents an axially inwardly directed shoulder in opposition to the shoulder 418 such that the tubular insert 410 is received within the body 12 in a snap-fit relation. With the tubular insert 410 secured to the body 12, the centre post member 25 is effectively secured to the body 12. In a similar manner to that with the embodiment of FIG. 16, the post 25 presents at its outer end an enlarged annular portion 300, which portion 300 is also now referred to as a plunger-like bell or bell 300.

Figure 21:
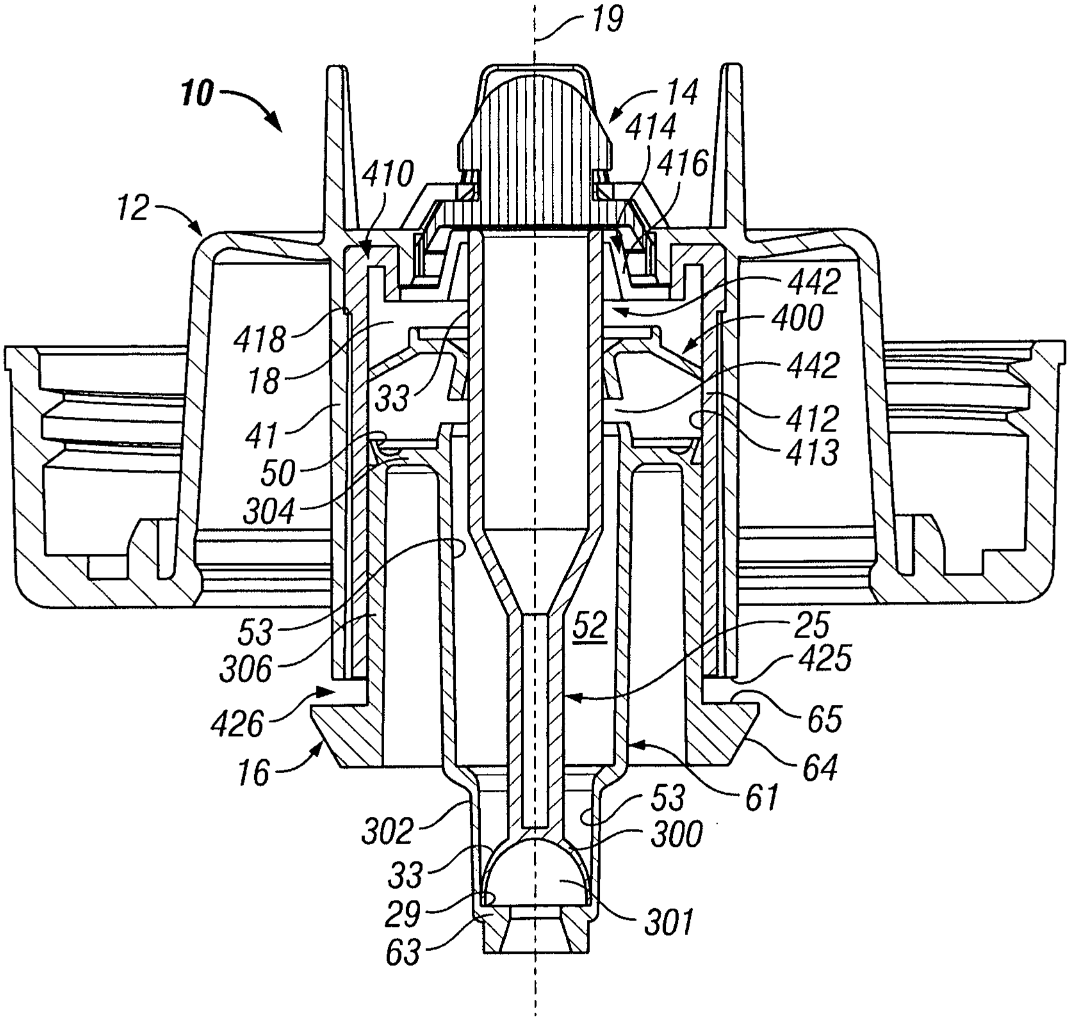
FIG. 21 is a cross-sectional view of an eleventh embodiment of a pump assembly in accordance with the present invention showing its stem in an uncompressed condition.

The piston 16 in FIG. 21 is also similar to the piston shown in FIG. 14 with the piston comprising an inner tubular portion 302 carrying at an outer end the end flange 63. The inner tubular portion 302 is joined by an inner annular bridging flange 304 to an outer cylindrical tube portion 306 which carries the sealing disc 50 and the engagement disc 64. However, in FIG. 21, the inner tubular portion 302 extends inwardly past the inner bridging flange 304 and carries an inner disc 400. The inner disc 400 extends radially outwardly into engagement with the inwardly directed surface 413 of the tubular insert 412. The inner disc 400 is sized to circumferentially engage the sleeve 412 so as to substantially prevent fluid flow there between inwardly, but to permit fluid flow outwardly there past. The circumferential out of periphery of the inner disc 400 is resilient and free to bend outwardly and thus permit outward flow of fluid from the reservoir 26 into the chamber 18 when the pressure in the chamber 18 inwardly of the disc 400 is less than the pressure outwardly of the disc 400.

Between the inner disc 400 and the sealing disc 50, inlet openings 442 are provided through the inner tubular portion 302 to permit fluid flow from between the inner disc 400 and the sealing disc 50 through the openings 442 into the annular passageway 52 between the inner tubular portion 302 of the piston 16 and the centre post member 25.

Figure 23:
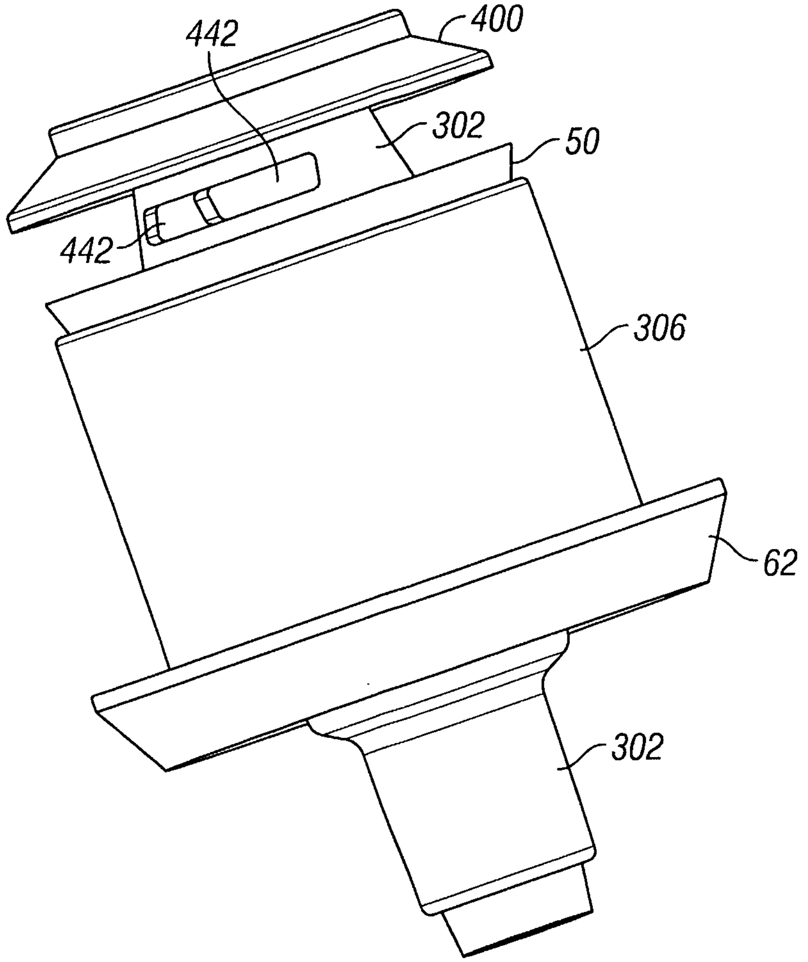
FIG. 23 is a perspective view of a piston of the pump assembly of FIG. 21.

The piston 16 is shown in a perspective view in FIG. 23 in which the opening 442 can be seen on diametrically opposite sides of the inner tubular portion 302, with remaining portions of inner tubular portion 302 connecting the inner disc 50 and the inner disc 40 which is not readily apparent from the cross-section shown in FIG. 21.

The inner tubular portion 302 has a central bore throughout its length which bore extends coaxially through the centre of the inner disc 400 where the inwardly directed side surface 53 of the passageway 52 engages with the outwardly directed side surface 33 of the centre post member 25 in a sealing arrangement to effectively prevent fluid flow there between. The sealing disc 50 engages the inwardly directed surface 413 of the sleeve 412 to provide a seal therewith preventing fluid flow outwardly therepast.

The enlarged annular portion 300 of the post member 25 effectively forms a resilient plunger bell 300 coaxial about the axis 19. Thus as described with the other embodiments and noted regarding the embodiment of FIG. 14, engagement between the outwardly directed side surface 33 of the central post member 25 over the bell 300 and the inwardly directed side surface 53 of the passageway 52 forms a one-way outlet valve. In the embodiment of FIGS. 21 to 24, the provision of the inner disc 400 is advantageous such that on withdrawal of the piston 16 outwardly, the inner disc 400 can serve a primary purpose of creating a vacuum in the chamber 18 between the inner disc 400 and the one-way valve 14 so as to draw fluid outwardly from the reservoir. This is to be contrasted with the embodiment of FIG. 16 in which merely engagement between the annular portion 300 of the post member 25 and the piston 16 is relied on to create a vacuum to draw fluid outwardly from the reservoir. The inner disc 400 in FIG. 21 thus to some extent serves a similar function to the inner disc 330 in the embodiments of FIGS. 18 and 19.

Figure 22:
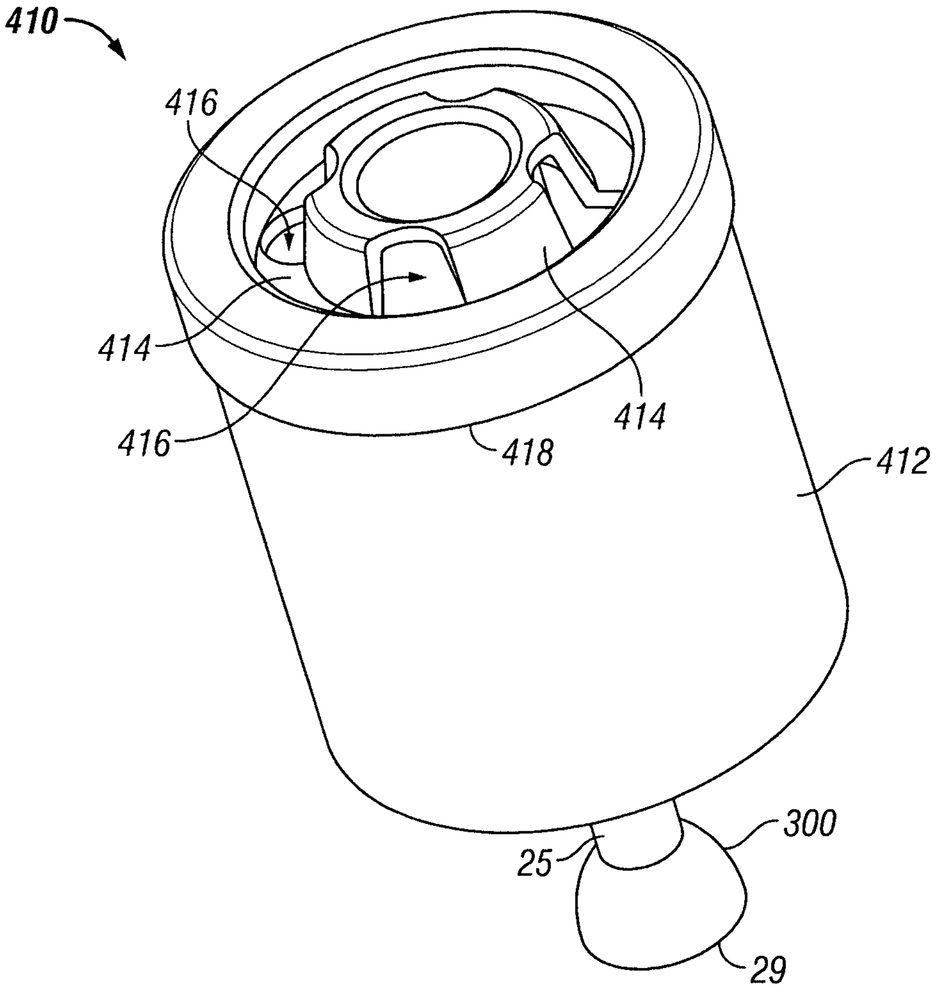
FIG. 22 is a perspective view of the tubular insert of the pump assembly of FIG. 21.

The bell 300 ends inwardly at its outer end 29, as best seen in FIG. 22. In FIG. 21, the outer end 29 of the bell 300 is in engagement with the end flange 63 of the inner tubular portion 302. FIG. 21 shows a condition in which the piston 16 has been moved inwardly relative to the body 12 until the end flange 63 commences to engage the outer end 29 of the bell 300. In this position an axially inwardly directed shoulder 65 of the engagement flange 64 is spaced axially from the axially directed outer end 424 of the inner cylindrical portion 41 of the body 12, forming an annular gap 426 there between.

Figure 24:
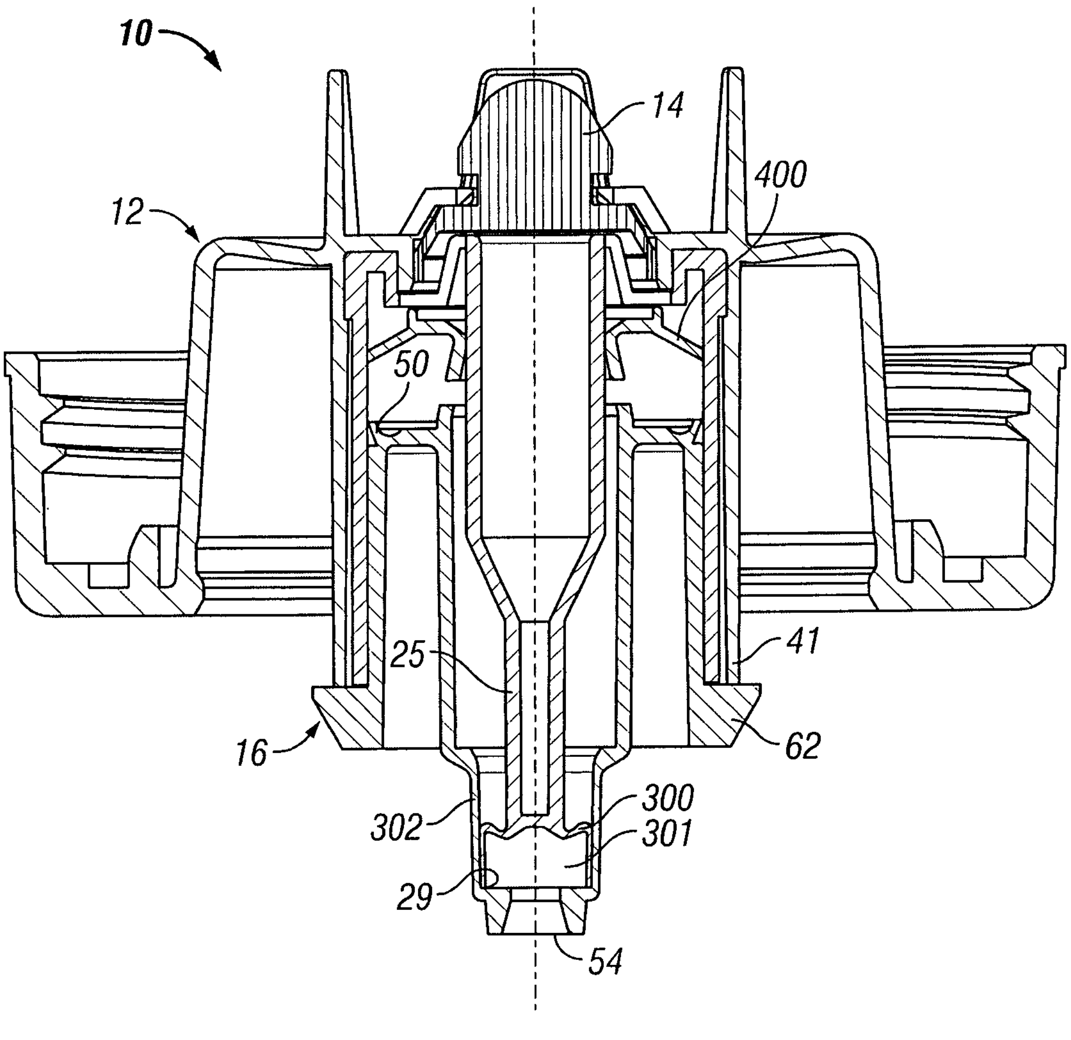
FIG. 24 is a cross-sectional side view of the pump assembly of FIG. 21 showing the stem in a compressed condition.

FIG. 24 is an identical cross-section to the pump assembly 10 shown in FIG. 21 with the exception that from the position shown in FIG. 21 the piston 16 has been moved inwardly relative to the body 12 such that the gap 426 in FIG. 21 has been reduced by the engagement flange 64 being moved into engagement with the inner cylindrical portion 41. The entire piston 16 has been moved inwardly. As seen in FIG. 21 there is a sufficient gap between the inner most end 428 of the inner tubular portion 302 proximate the inner disc 400 that the piston 16 is free to move inwardly until the engagement flange 64 engages the outer end of the inner cylindrical portion 41. In movement of the piston 16 inwardly from the position of FIG. 21 to the position of FIG. 24, axially inwardly directed compressive forces are applied to the distal end 29 of the bell 300. The bell 300 is selected such that its walls are more resilient than the remainder of the centre post member 25 with the result that the bell 300 is deformed as to adopt a configuration as illustrated in FIG. 24 and in which the volume within a bell compartment 301 within the bell 300 is reduced in FIG. 24 compared to the volume of the bell compartment 301 in FIG. 21. Such reduction in volume within the bell 300 serves in moving from the position of FIG. 21 to the position of FIG. 24, to discharge fluid within the bell 300 outwardly out the discharge outlet 54.

In use of the pump as shown in FIGS. 21 to 24, the piston 16 is moveable relative the body 12 to an extended outer position which assumes a position outward in the position shown in FIG. 21. From the fully extended outer position the piston 16 is moved inwardly so as to discharge fluid out the discharge outlet 54. On the piston 16 reaching the position in FIG. 21, further inward movement causes compression of the bell 300 which assists in dispensing fluid by reducing the volume in the bell compartment 301 internally within the bell 300 until the piston 16 reaches the fully retracted position shown in FIG. 24. In a withdrawal stroke, on moving the piston outwardly, with first movement of the piston from the position of FIG. 24 to the position of FIG. 21, the volume in the bell compartment 301 within the bell 30 increases thus providing for a vacuum in the passageway which will attempt to drawback fluid inwardly past the bell 300 from the discharge outlet 54, as may be permitted by the bell 300.

In the embodiment of FIG. 21, a tubular insert 410 is provided. The tubular insert 410 is advantageously of a relatively flexible material which may be more flexible than the body 12. The tubular sleeve 412 is shown to be formed to be cylindrical but as tapering axially outwardly to its out end 425. This tapering is advantageous so as to provide improved sealing between the sleeve 412 and each of the sealing disc 50 and the inner disc 400. The sleeve 412, however, is not required and the sealing disc 50 and the inner disc 400 may be sized to engage the inside surfaces of the inner cylindrical portion 41 of the body 12 as in other embodiments. For example, the sleeve 412 could be eliminated outwardly of the shoulder 414 and still serve a function of securing the central post member 25 to the body 12.

Figure 25:
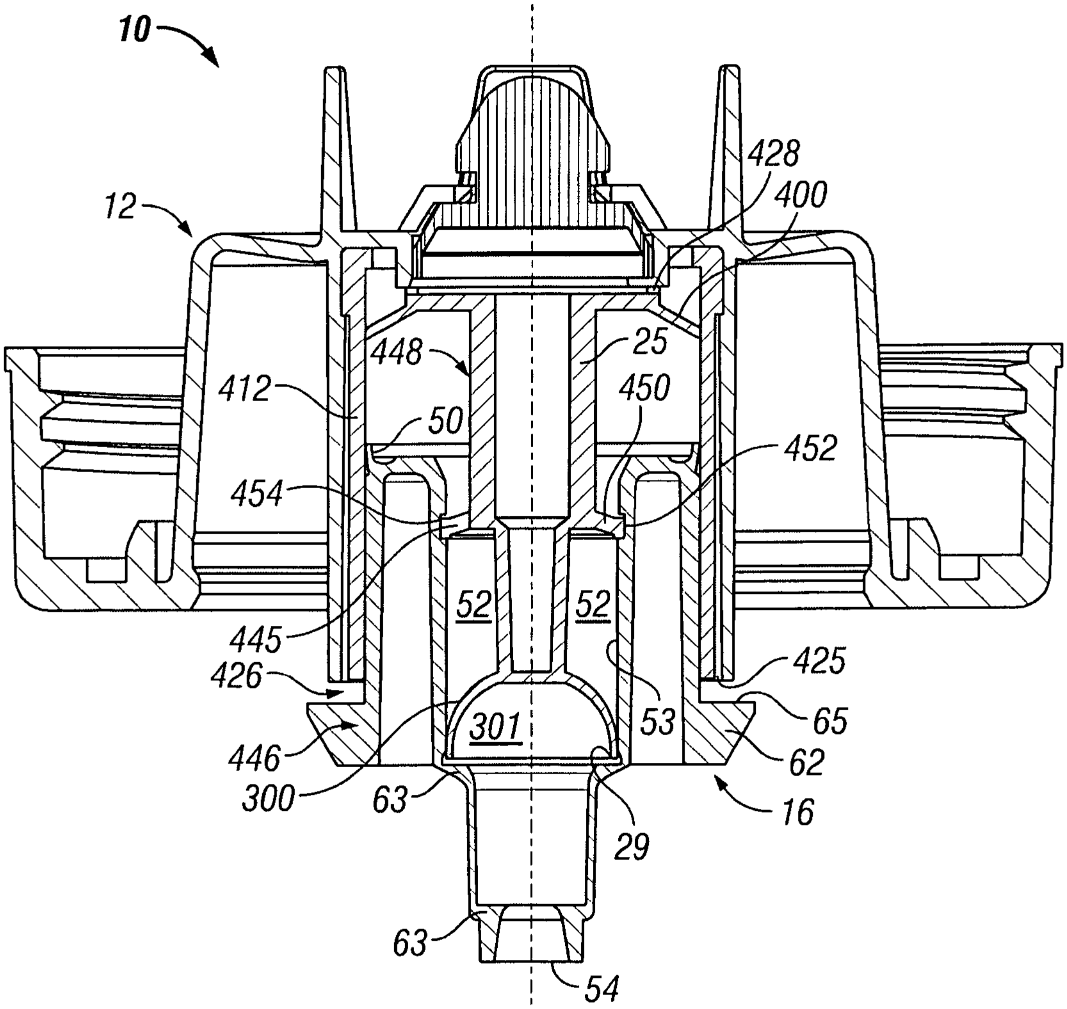
FIG. 25 is a cross-sectional side view of a twelfth embodiment of a pump assembly in accordance with the present invention showing its stem in an uncompressed condition.
Figure 26:
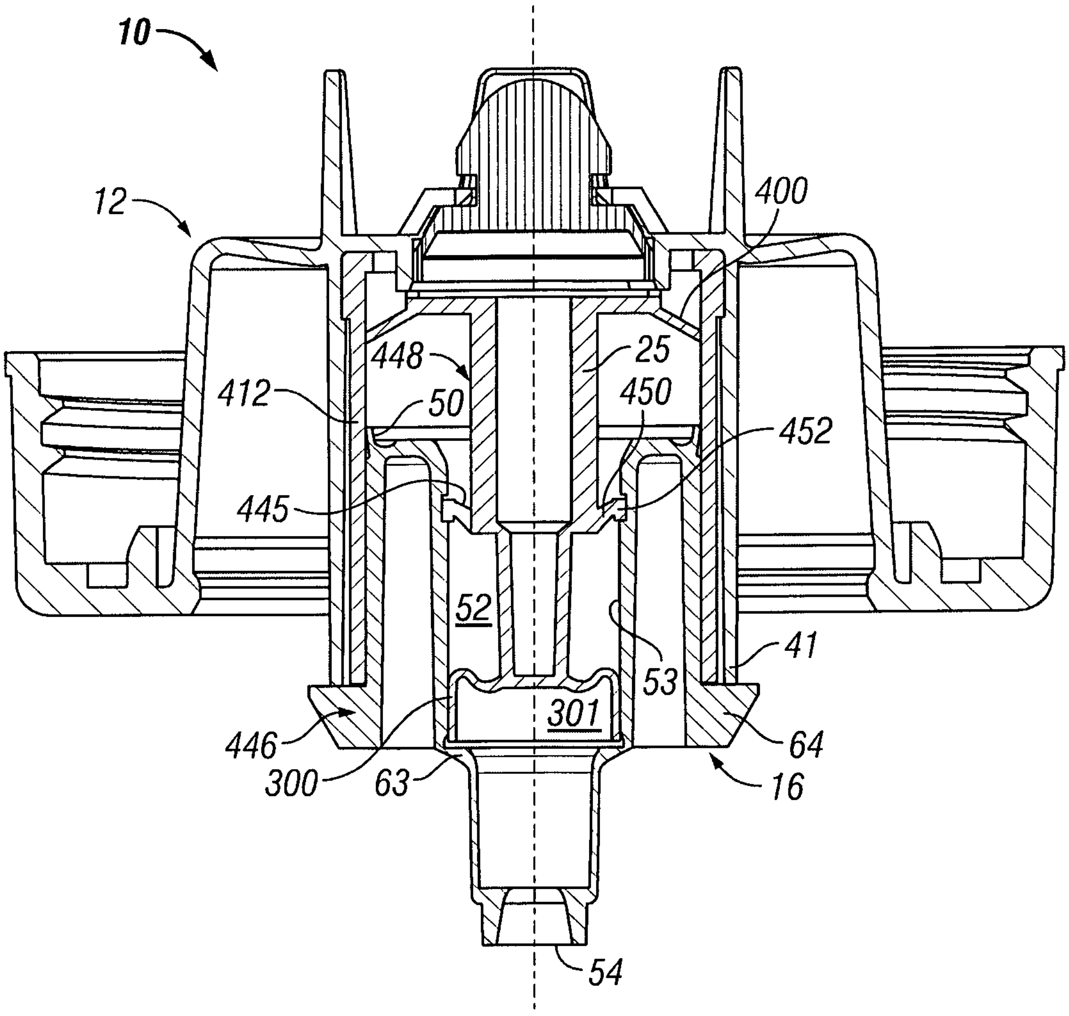
FIG. 26 is a cross-sectional view of the pump assembly of FIG. 25 but with the stem in a compressed condition.

Reference is made to FIGS. 25 and 26 which show a twelfth embodiment of a pump assembly 10 in accordance with the present invention. FIG. 25 shows a pump assembly 12 having a sleeve 412 secured therein in the same manner as that shown in the embodiment of FIG. 21, however, without the sleeve 412 carrying or being connected to central post member 25. In FIG. 25, a piston assembly 16 is shown which comprises two pieces, namely a tube portion 446 and a stem portion 448. The stem portion 448 carries the post member 25 with the bell 300 at an outer end and the inner disc 400 at an inner end. The stem portion 448 is connected to the tube portion 446 by a spring disc-like flange 450 which is provided on the stem portion 448 and extends radially outwardly from the stem portion 448 to a distal circumferential end 452. The tube portion 446 has in the inwardly directed side surface 53 of the passageway 52 a radially outwardly extending annular channel 454 sized to securely receive the circumferential end 452 of the flange 450 therein. The flange 450 has a series of circumferentially spaced radially inwardly extending passageways 455 therethrough, one of which is shown in each of FIGS. 25 and 26 such that fluid may flow in the passageway 52 axially through the flange 450. The flange 450 is resilient such that from an inherent position of the flange 450 shown in FIG. 25, the flange may deflect axially relative to the tube portion 446 as seen in FIG. 26.

The tube portion 446 carries the inner tubular portion 302, the sealing flange 50 and the engagement flange 62. The inner tubular portion 302 carries the end flange 63 adapted to engage the end 29 of the bell 300.

FIG. 25 shows a configuration of the piston assembly 16 in an unbiased configuration. FIG. 25 shows innermost end 428 of the stem portion 448 engages the body 12 limiting further inward movement of the stem position 448. In the position of FIG. 25, the gap 426 is formed between the inwardly directed surface 65 of the engagement flange 64 and the outwardly directed surface 425 of the inner cylindrical portion 41.

FIG. 26 illustrates a condition which arises when the piston assembly 16 as shown in FIG. 25 is moved further inwardly relative to the body 12 so as to move the engagement flange 64 into engagement with the inner cylindrical portion 41 and effectively eliminate the gap 426. The innermost end 428 of the stem portion 448 effectively is maintained in its same position relative to the body 12 and inward movement of the tube portion 446 causes the deflection of the flange 450 and deflection of the bell 300 reducing the volume of the bell compartment 301 of the bell 300 discharging fluid outwardly through the discharge outlet 54. In movement from the position of FIG. 25 to the position of FIG. 26, the volume between the inner disc 400 and the sealing disc 50 is also reduced, also discharging fluid outwardly past the bell 300 and towards the discharge outlet 54.

In a withdrawal stroke, on moving from the position of FIG. 26 to the position of FIG. 25 there is a drawback of fluid from the discharge outlet 54 as permitted by the bell 300 firstly, due to the increase in volume between the inner disc 400 and the sealing disc 50 and secondly due to the increase in the volume within the bell compartment 301.

Figure 27:
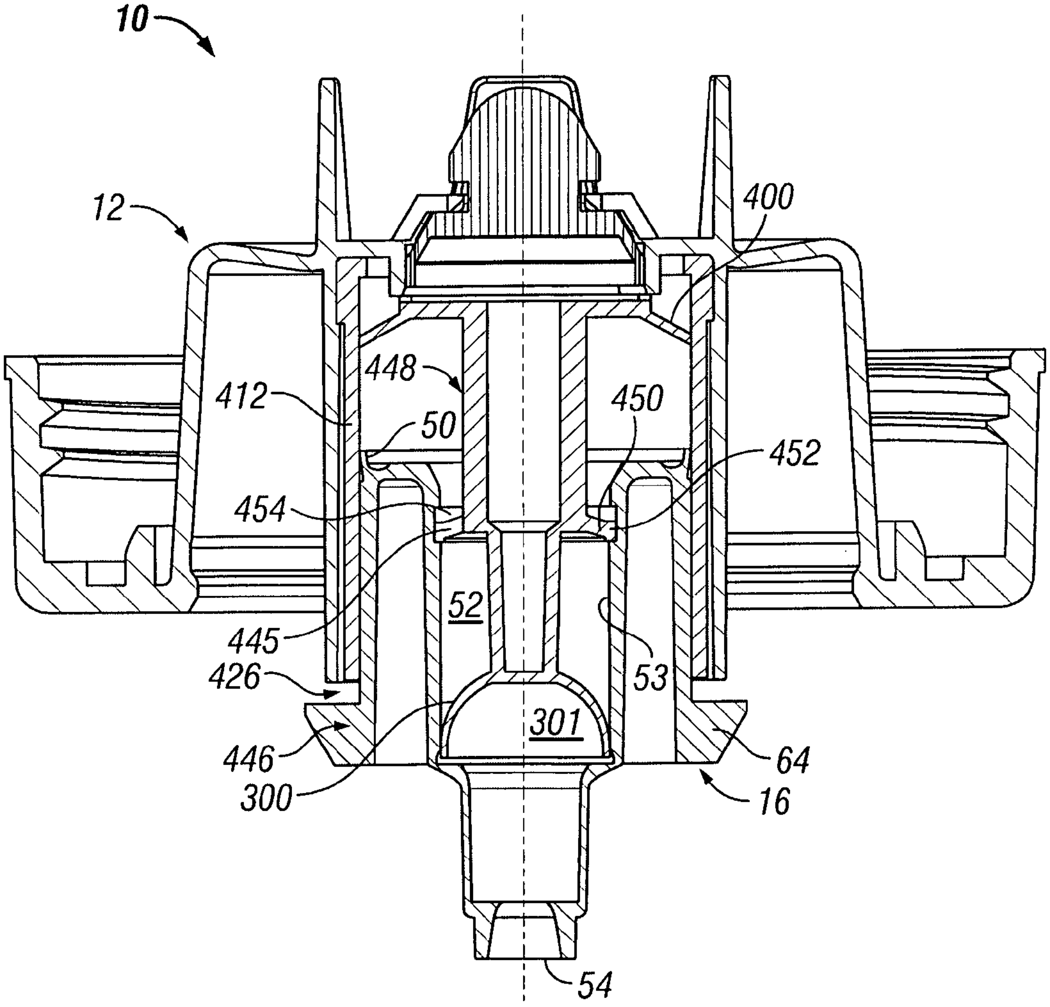
FIG. 27 is a cross-sectional side view of a thirteenth embodiment of a pump assembly in accordance with the present invention.
Figure 28:
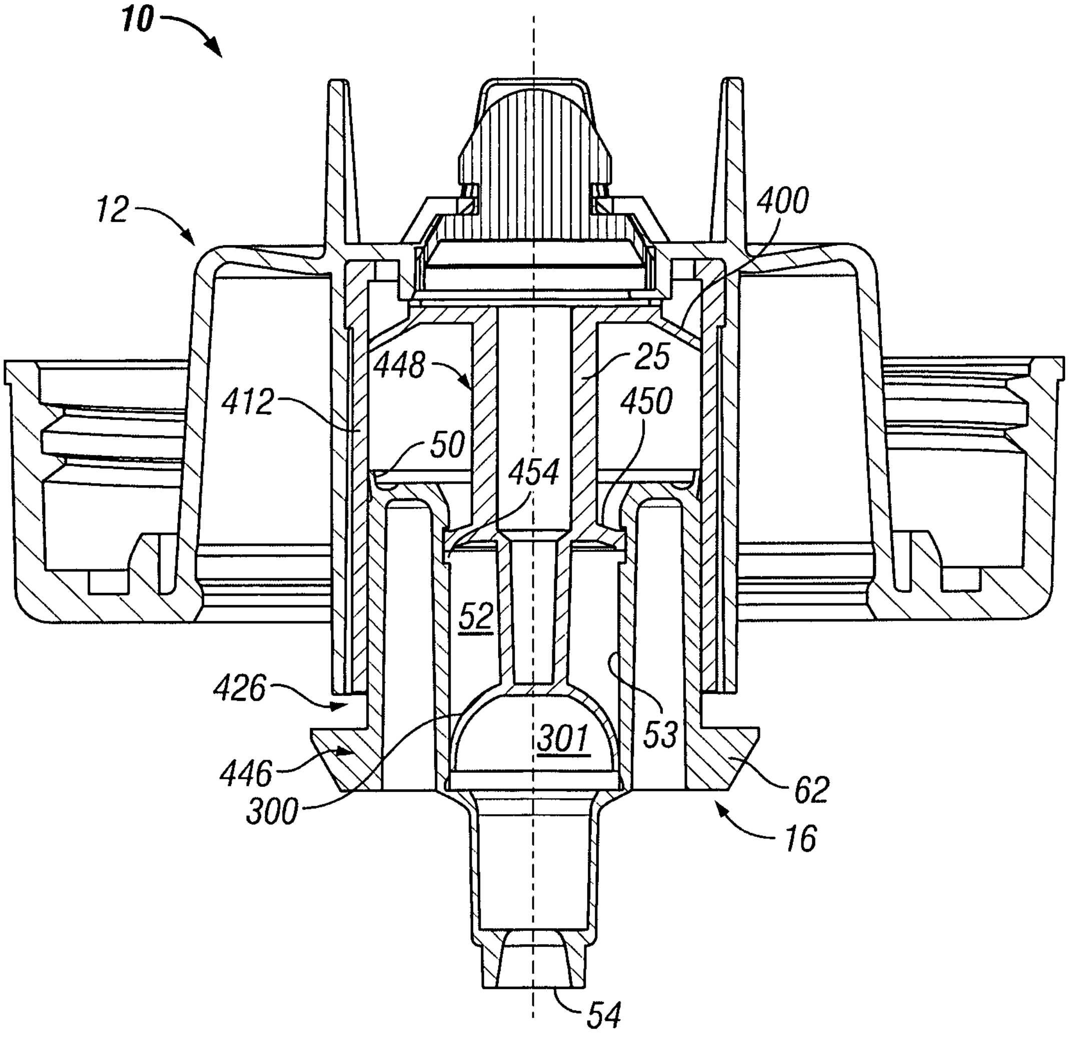
FIG. 28 is a cross-sectional side view of the pump assembly of FIG. 27 but with the tube portion of the piston assembly moved outwardly relative to the position shown in FIG. 27.

Reference is made to the fourteenth embodiment shown in FIGS. 27 and 28. The embodiment of FIGS. 27 and 28 is identical to the embodiment of FIGS. 25 and 26 with the sole exception that the annular channel 454 in the side surface 53 of the passageway 52 has an increased axial extent which permits the stem portion 448 to slide axially relative to the tube portion 446. Relative sliding provides a lost-link type arrangement which provides for increased draw back of fluid in a withdrawal stroke. That is, a withdrawal stroke, on moving from the position of FIG. 27 to the position of FIG. 28, the volume between the inner disc 400 and the sealing disc 50 increases thus providing drawback of fluid from the discharge outlet 54. The embodiment of FIGS. 27 and 28 can be pushed inwardly to a position similar to that shown in FIG. 26 in which the engagement flange 64 engages the body 12 with the flange 450 being deflected and the bell 300 being compressed. From such a comparable position as shown in FIG. 26, on withdrawal of the tube portion 446 outwardly to the position of FIG. 27 drawback occurs due to the return of the flange 450 to an undeflated condition and the increase in volume of the bell compartment 301 with the axial sliding of the flange 450 outwardly in the annular channel 454 relative to the tube portion 446. One or more of these draw back features may be utilized in embodiments in accordance with the present invention.

Each of the various embodiments of the pump assemblies is adapted for dispensing flowable materials including liquids. The embodiment of FIG. 19 for creating a foamed discharge of the flowable material and air preferably uses a flowable material such as a liquid which does not clog the foam creating screen. The other embodiments have advantageous use with pastes and flowable materials with relatively high viscosity compared to water, but may be used with any liquids such as water and alcohol.

Flowable materials have different dynamic viscosity typically measured in centipoises (cP) which are temperature sensitive. Centipoise is the cgs physical unit for dynamic viscosity whereas the SI physical unit for dynamic viscosity is pascal-second (Pa). One centipoise (cP) equals one milli pascal-second (mPa). Typical viscosities for exemplary flowable materials at room temperatures in the range of 65 to 75 degrees F. are set out in the table below:

| Viscosity in cP or mPa | Flowable Material |
|---|---|
| 1 | Water |
| 103 | Peanut oil |
| 180 | Tomato juice |

-continued

| Viscosity in cP or mPa | Flowable Material |
|---|---|
| 435 | Maple Syrup |
| 1000 | Spaghetti Sauce |
| 2000 | Barbecue Sauce |
| 2250 | Chocolate Syrup |
| 5000 | Shampoo |
| 5000 | Hand Lotion |
| 5000+ | Mayonnaise |
| 10,000 | Mustard |
| 50,000 | Ketchup |
| 64,000 | Petroleum Jelly |
| 70,000 | Honey |
| 100,000 | Sour Cream |
| 250,000 | Peanut Butter |

The pumps in accordance with the preferred embodiments are preferably adapted for dispensing flowable materials having viscosities at room temperature greater than 400 cP, more preferably greater than 1000 cP, more preferably greater than 2000 cP, more preferably greater than 4000 cP and, more preferably, greater than 5000 cP. The pumps in accordance with the preferred embodiments are suitable for dispensing viscous hand creams and lotions which may have viscosities at room temperature greater than 4000 cP and, for example, in the range of 1,000 cP to 100,000 cP, more preferably 2,000 to 70,000 cP.

Although the disclosure describes and illustrates a preferred embodiment of the invention, it is to be understood that the invention is not limited to these particular embodiments. Many variations and modifications will now occur to those skilled in the art.

We claim:

1. A fluid pump comprising:

a piston chamber-forming member defining a chamber about a chamber axis, the chamber having a radially inwardly directed chamber wall, an inner inlet end and an outer open outlet end, the inlet end of the chamber providing for communication with a source of fluid, the piston chamber-forming member including a center post member extending along the axis coaxially of the chamber outwardly from an inner end of the post member to a distal outer end of the post member whereby an annular compartment is defined within the chamber between the chamber wall and the post member, the piston chamber-forming member including the chamber and the post member formed as a unitary element by injection molding with the inner end of the post member fixedly integrally attached to the piston chamber-forming member proximate the inlet end of the piston chamber-forming member against relative movement, an inlet one-way valve across the inlet end of the chamber permitting fluid flow outwardly but preventing fluid flow inwardly, an annular piston-forming element coaxially slidably received in the annular compartment for reciprocal movement between a retracted position and an extended position with the post member received in a central passageway through the piston-forming element and the chamber wall radially outwardly of the piston-forming element, engagement between the piston-forming element and the chamber wall preventing fluid flow therebetween outwardly, an outlet one-way valve provided by engagement between the post member and the passageway preventing fluid flow inwardly therepast but permitting fluid flow outwardly therepast, wherein sliding of the piston-forming element inwardly relative the piston chamber-forming member reduces the volume of the compartment between the inlet one-way valve and the outlet one-way valve such that fluid is forced to pass outwardly in the passageway past the outlet one-way valve annularly about the post member, and wherein sliding of the piston-forming element outwardly relative the piston chamber-forming member draws fluid past the one-way valve outwardly into the compartment.

2. A fluid pump as claimed in claim 1 wherein:

at an outer end of the passageway a radially inwardly extending discharge flange is provided which is outwardly from the distal outer end of the post member and extends radially inwardly of the distal outer end of the post member, a discharge outlet on the discharge flange, a discharge chamber is defined within the passageway outward of the outlet one-way valve between the post member and an outer end of the discharge flange, wherein sliding of the piston-forming element inwardly relative the piston chamber-forming member simultaneously (a) reduces the volume of the compartment between the inlet one-way valve and the outlet one-way valve such that fluid is forced to pass outwardly in the passageway past the outlet one-way valve annularly into the discharge chamber and (b) reduces the volume in the discharge chamber such that fluid is forced from the discharge chamber out the discharge outlet.

3. A fluid pump as claimed in claim 2 wherein sliding of the piston-forming element outwardly relative the piston chamber-forming member fluid also draws atmospheric air and any fluid in the discharge outlet inwardly through the discharge outlet into the discharge chamber.

4. A fluid pump as claimed in claim 2 wherein the post member carries at its outer distal end a stopper member which, in a sealing position selected the extended position and a position in which the piston-forming element is outwardly of the extended position, engages the discharge flange to prevent fluid flow outwardly through the discharge opening, and on movement of the piston-forming element inwardly from the sealing position permits fluid flow through the discharge outlet.

5. A fluid pump as claimed in claim 1 wherein:

the post member having a radially outwardly directed side surface, the compartment defined within the chamber between the chamber wall and the side surface of the post member, the passageway extending coaxially through the piston-forming element from an inner end of the passageway to an outer end of the passageway, the passageway having a radially inwardly directed side surface, the piston-forming element having a radially outwardly directed side surface, the piston-forming element received in the compartment with the chamber wall radially outwardly of the outwardly directed side surface of the piston-forming element, engagement between the outwardly directed side surface of the piston-forming element and the chamber wall preventing fluid flow therebetween outwardly, the outlet one-way valve provided by engagement between an outward annular portion of the radially outwardly directed side surface of the post member and an inward annular portion of the radially inwardly directed of the side surface of the passageway preventing fluid flow inwardly therepast but permitting fluid flow outwardly therepast, the inward annular portion being: (a) resilient to deflect when pressure on an inner side thereof exceeds pressure on an outer side thereof to permit fluid flow outwardly therepast and (b) biased when deflected to return towards an unbiased condition in which engagement between the inward annular portion and the outward annular portion prevents fluid flow outwardly, wherein sliding of the piston-forming element inwardly relative the piston chamber-forming member pressurizes fluid in the compartment inwardly of the piston-forming element to deflect the inward annular portion such that fluid passes outwardly between the inward annular portion and the outward annular portion and outwardly in the passageway out the outer end of the passageway.

6. A fluid pump as claimed in claim 5 wherein:

the radially outwardly directed side surface of the post member is generally circular in cross-section normal to the axis.

7. A fluid pump as claimed in claim 6 wherein:

engagement between the piston-forming element and the chamber wall also prevents fluid flow therebetween inwardly.

8. A fluid pump as claimed in claim 7 wherein the inward annular portion comprises a resilient disc extending radially inwardly with a circumferential radially innermost distal edge for engagement with the outward annular portion.

9. A fluid pump as claimed in claim 7 wherein the inward annular portion includes a resilient tubular sleeve portion for engagement with the outward annular portion, the sleeve portion having an inherent circumference which is less than a circumference of the outward annular portion, the sleeve portion being deformable to adopt deflected conditions in which the circumference of the sleeve portion is greater than the circumference of the outward annular portion so as to permit fluid flow outwardly therepast.

10. A fluid pump as claimed in claim 6 wherein:

engagement between the outwardly directed side surface of the piston-forming element and the chamber wall also prevents fluid flow therebetween inwardly.

11. A fluid pump as claimed in claim 5 wherein in all positions of the piston-forming element relative the piston chamber-forming member between the retracted position and the extended position the outer end of the passageway is outwardly of the outer end of the post member.

12. A pump as claimed in claim 5 for use in dispensing a fluid having a dynamic viscosity at room temperature selected from the group consisting of greater than 2000 cP, greater than 4000 cP and greater than 5000 cP.

13. A fluid pump as claimed in claim 1 wherein:

the post member having a radially outwardly directed side surface, the compartment defined within the chamber between the chamber wall and the side surface of the post member, the passageway extending coaxially through the piston-forming element from an inner end of the passageway to an outer end of the passageway, the passageway having a radially inwardly directed side surface, the piston-forming element having a radially outwardly directed side surface, the piston-forming element received in the compartment with the chamber wall radially outwardly of the outwardly directed side surface of the piston-forming element, engagement between an annular portion of the outwardly directed side surface of the piston-forming element and the chamber wall preventing fluid flow therebetween outwardly, the outlet one-way inlet valve provided by engagement between an outward annular portion of the radially outwardly directed side surface of the post member and an inward annular portion of the radially inwardly directed of the side surface of the passageway preventing fluid flow inwardly therepast but permitting fluid flow outwardly therepast, one of the outward annular portion and the inward annular portion being: (a) resilient to deflect when pressure on an inner side thereof exceeds pressure on an outer side thereof to permit fluid flow outwardly therepast and (b) biased when deflected to return towards an unbiased condition in which engagement between the inward annular portion and the outward annular portion prevents fluid flow outwardly, wherein sliding of the piston-forming element inwardly relative the piston chamber-forming member pressurizes fluid in the compartment inwardly of the piston-forming element to deflect the deflectable one of the inward annular portion and the outward annular portion such that fluid passes outwardly between the inward annular portion and the outward annular portion and outwardly in the passageway out the outer end of the passageway.

14. A fluid pump as claimed in claim 13 wherein the one of the inward annular portion and the outward annular portion that is resilient is the outward annular portion.

15. A fluid pump as claimed in claim 14 wherein the outward annular portion of the radially outwardly directed side surface of the post member comprises a resilient disc extending radially outwardly from the post member with a circumferential radially outermost distal edge for engagement with the radially inwardly directed of the side surface of the passageway.

16. A fluid pump as claimed in claim 14 wherein the outward annular portion includes a resilient tubular sleeve portion for engagement with the inward annular portion, the sleeve portion having an inherent circumference which is greater than a circumference of the inward annular portion, the sleeve portion being deformable to adopt deflected conditions in which the circumference of the sleeve portion is less than the circumference of the inward annular portion so as to permit fluid flow outwardly therepast.

17. A fluid pump as claimed in claim 13 wherein:

the post member received in the passageway with the radially outwardly directed surface of the post member radially inwardly of the radially inwardly directed side surface of the passageway.

18. A fluid dispenser comprising a reservoir containing a fluid, a piston chamber-forming member defining a chamber about a chamber axis, the chamber having a radially inwardly directed chamber wall, an inner inlet end and an outer open outlet end, the inlet end of the chamber for communication with the reservoir, the piston chamber-forming member including a center post member having an inner end and a distal outer end, a piston chamber-forming member including the chamber and the post member formed as a unitary element by injection molding with the inner end of the post member fixedly integrally attached to the piston chamber-forming member at the inlet end of the piston chamber-forming member with the post member extending along the axis coaxially of the chamber outwardly from the inner end of the post member to the distal outer end of the post member, the post member having a radially outwardly directed side surface which is generally circular in cross-section normal to the axis, an inlet one-way valve across the inlet end of the chamber permitting fluid flow outwardly but preventing fluid flow inwardly, a piston-forming element coaxially slidably in the chamber between a retracted position and an extended position, the piston-forming element having a hollow stem with a central passageway extending coaxially through the stem from an inner end of the stem to an outer end of the stem with the passageway forming a discharge opening at the outlet end of the stem, the passageway having a radially inwardly directed side surface, a disc extending radially outwardly from the stem with a circumferential radially outer distal edge for engagement with the chamber wall to prevent fluid flow therebetween outwardly and inwardly, an outward annular portion of the radially outwardly directed side surface of the post member engaging an inward annular portion of the radially inwardly directed of the side surface of the stem to prevent fluid flow inwardly therepast but permitting fluid flow outwardly therepast, the inward annular portion of the radially inwardly directed of the side surface of the stem being (a) resilient to deflect when pressure on an inner side thereof exceeds pressure on an outer side thereof to permit fluid flow outwardly therepast and (b) biased when deflected to return towards an unbiased condition in which engagement between the inward annular portion and the outward annular portion prevents fluid flow outwardly, in all positions of the piston-forming element relative the piston chamber-forming member between the retracted position and the extended position, the piston-forming element is coupled to the piston chamber-forming member with the passageway coaxially about the post member and the disc in the chamber with the outer distal edge of the disc engaging the chamber wall, whereby a compartment is defined in the chamber between the piston-forming element and the piston chamber-forming member enclosed by the one-way valve, the disc, the inward annular portion and the outward annular portion, which compartment has a volume which varies with relative axial sliding of the piston-forming element in the piston chamber-forming member between the retracted position and the extended position, wherein with sliding of the piston-forming element inwardly relative the piston chamber-forming member the volume of the compartment is reduced pressurizing fluid in the compartment to deflect the deflectable one of the inward annular portion and the outward annular portion such that fluid passes outwardly between the inward annular portion and the outward annular portion and outwardly in the passageway to exit the discharge outlet, and wherein with sliding of the piston-forming element outwardly relative the piston chamber-forming member the volume of the compartment is increased drawing fluid from the reservoir past the inlet one-way valve outwardly into the compartment.

* * * * *